(12) United States Patent
Sakai

(10) Patent No.: US 6,339,562 B1
(45) Date of Patent: Jan. 15, 2002

(54) OPTICAL PICKUP DEVICE

(75) Inventor: Keiji Sakai, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/367,002

(22) PCT Filed: Feb. 6, 1998

(86) PCT No.: PCT/JP98/00490

§ 371 Date: Aug. 3, 1999

§ 102(e) Date: Aug. 3, 1999

(87) PCT Pub. No.: WO98/35346

PCT Pub. Date: Aug. 13, 1998

(30) Foreign Application Priority Data

Feb. 7, 1997 (JP) .............................. 9-024203

(51) Int. Cl.$^7$ ................................ G11B 7/12
(52) U.S. Cl. ................ 369/44.23; 369/44.12; 369/44.25; 369/112.01
(58) Field of Search .................. 369/44.23, 44.12, 369/44.25, 44.27, 44.28, 44.32, 44.41, 47.1, 53.28, 112.01, 112.05, 109.01, 109.02

(56) References Cited

U.S. PATENT DOCUMENTS 5,128,914 A * 7/1992 Kurata et al. ............ 369/44.37
5,881,035 A 3/1999 Ueyama ................. 369/44.23
5,986,996 A * 11/1999 Kitamura et al. ..... 369/44.12 X

FOREIGN PATENT DOCUMENTS

| JP | 60-9019 | 1/1985 |
|----|---------|--------|
| JP | 2-94119 | 4/1990 |
| JP | 2-185722 | 7/1990 |
| JP | 3-209639 | 9/1991 |
| JP | 5-151609 | 6/1993 |
| JP | 6-195727 | 7/1994 |

OTHER PUBLICATIONS

International Search Report dated Apr. 21, 1998.

* cited by examiner

*Primary Examiner*—Muhammad Edun
(74) *Attorney, Agent, or Firm*—David G. Conlin; Peter J. Manus; Dike Bronstein Roberts & Cushman

(57) ABSTRACT

A light receiving element (7) receiving return light from an optical disk has main light receiving sections (7a, 7b) and sub light receiving sections (7e, 7f). A focus error signal is found by computing (Sa+Sf)−(Sb+Se), where Sa, Sb, Se, and Sf represent output signals of the light receiving sections (7a, 7b, 7e, 7f), respectively. Each of the sub light receiving sections (7e, 7f) has a smaller area than each of the main light receiving sections (7a, 7b) has. With the foregoing arrangement, upon access to a multilaminate optical disk in which distances between recording layers are small, respective focus error signals from the recording layers do not interfere with each other, and occurrence of an offset can be suppressed even in the case where an assembly error of the optical element or the like exists.

7 Claims, 17 Drawing Sheets

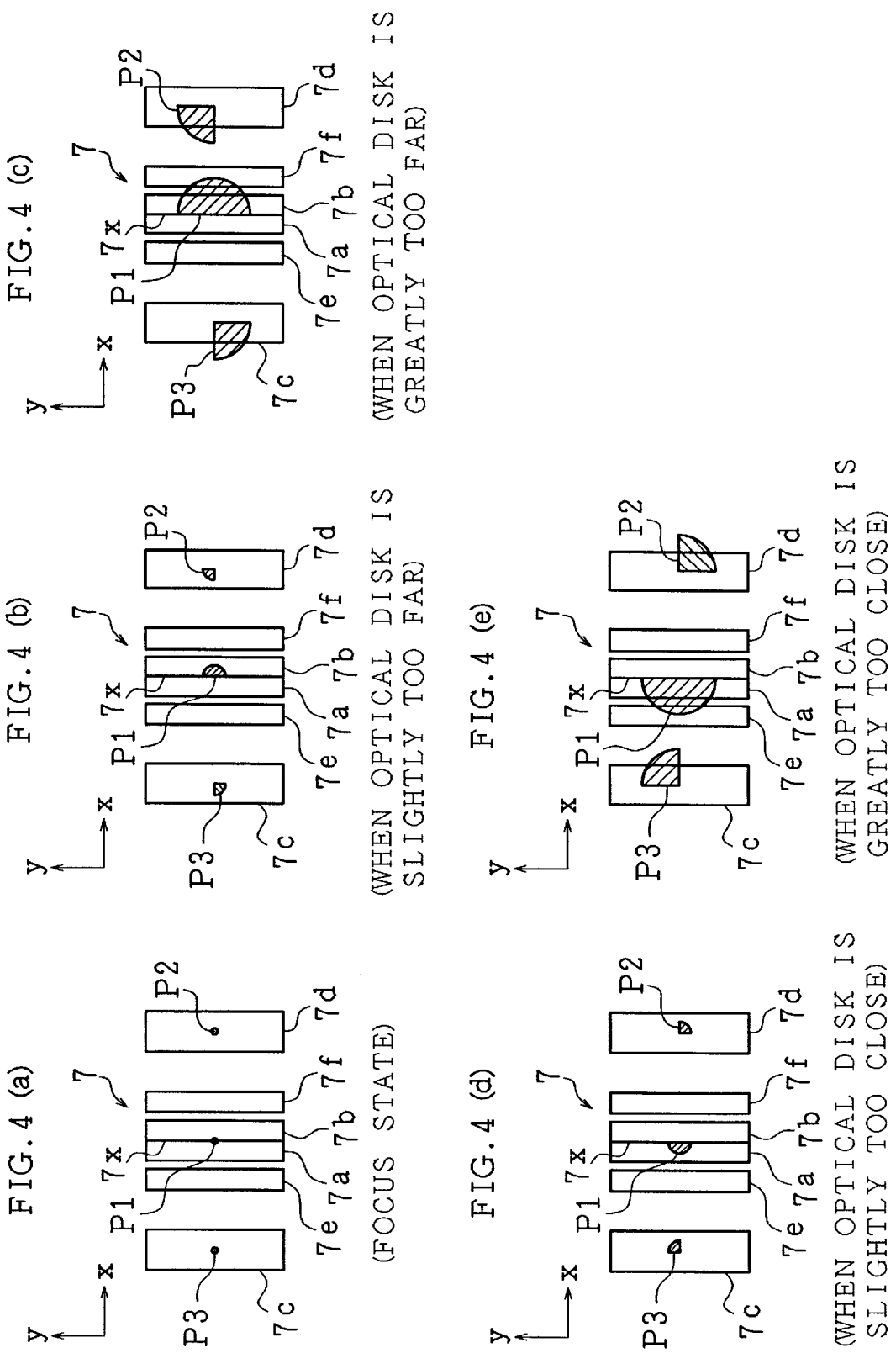

W2=26μm

W2=26μm

W2=20μm

W2=20μm

W2=13μm

W2=13μm

W2=7μm

W2=7μm

OPTICAL PICKUP DEVICE

TECHNICAL FIELD

The present invention relates to an optical pickup device installed in an optical disk device for optically recording/reproducing information to/from an information recording medium such as an optical disk, or more specifically, relates to an optical pickup device capable of precisely recording/reproducing information to/from an optical disk having a plurality of recording/reproduction layers.

BACKGROUND ART

Recently, practical application of optical disks is promoted in audio, video, computer, and other various fields since an optical disk is capable of recording massive information signals at high density.

In compact disks (CD), video disks, mini disks (MD), computer-use magneto-optical disks, and the like which are now widely put on the market, a 1.2 mm thick substrate is usually used. An objective lens of an optical pickup is also usually designed so as to correct aberration which occurs due to the 1.2 mm thick substrate.

On the other hand, various techniques are examined to increase recording capacity, including a technique of improving optical resolution by increasing a numerical aperture (NA) of an objective lens, and a technique of improving a recording layer is multilaminate.

For example, the Japanese Publication for Laid-Open Patent Application No. 5-151609/1993 (Tokukaihei 5-151609) discloses an optical disk device for reproducing information from an optical disk having a plurality of data layers so that data recorded in the data layers are separately reproduced from the respective data layers. The recording/reproduction layers of the foregoing multilaminate disk are formed by alternately laminating transparent substrates and aerial layers. Information is recorded/reproduced by shifting a focus of an objective lens in an optical axis direction by driving it with an actuator.

In the foregoing example, return light from recording/reproduction layers adjacent to the target layer does not affect since the layers are disposed at sufficient distances. For example, a focus error signal (FES) of an n'th layer becomes 0 when an (n+1)'th or (n−1)'th layer is brought into focus, thereby causing no affect such as offset on FESs of other layers. However, since the layers are disposed at great distances, in the case where focus servo is applied to each layer, a total thickness of the whole disk substrate to be brought into focus greatly varies. Therefore, it is also necessary to correct spherical aberration which is generated on each layer, by using an aberration compensator.

As a disk free from the foregoing problem, a double-layer disk having two data layers at a distance (for example, 40 μm to 70 μm) which is very small as compared with a thickness of the substrate has been proposed as a digital versatile disk (DVD) or the like. In this case, spherical aberration occurring due to a difference in the substrate thickness is sufficiently small, and hence no aberration compensator is needed.

However, as to a disk in which recording/reproduction layers are laminated at such a small distance, when a light beam accesses one recording/reproducing surface, a reflected light from the accessed recording/reproducing surface is affected by return light from other recording/reproducing surfaces adjacent to the accessed surface. Therefore, a focus error signal for focus adjustment of the light beam is also affected by the return light, and as a result, precise focus adjustment cannot be conducted.

An example of an optical system for use with the foregoing multilaminate disk in which layers are formed at sufficiently small distances is disclosed, for example, in the Japanese Publication for Laid-Open Patent Application No. 9-161282/1997 (Tokukaihei 9-161282). The optical system is arranged so that, as shown in FIG. 16, light from a semiconductor laser 1 is converged onto an optical disk 5 by an objective lens 4, and a returned light therefrom is led to a light receiving element 6 by a three-division hologram element 2. The semiconductor laser 1, the hologram element 2, and the light receiving element 6 are integrally provided.

As shown in FIG. 17, the light receiving element 6 has (i) two main light receiving sections 6a and 6b for focus error signal (FES) detection use, provided adjacent to each other, and (ii) sub light receiving sections 6e and 6f for focus error signal compensation use, provided outside the main light receiving sections 6a and 6b, respectively. Either the main light receiving section 6a or 6b receives return light, depending on the direction of the focus adjustment. The sub light receiving sections 6e and 6f are disposed at positions such that they detect light when, in a defocus state, the return light falls also outside the main light receiving sections 6a and 6b. Thus, by using a pair of beam spots formed with the focus-error-detection-use return light on the sub light receiving sections 6e and 6f, a focus error is detected and a focus error signal is generated.

More specifically, let output signals of the light receiving sections 6a, 6b, 6e, and 6f be Sa, Sb, Se, and Sf, respectively, then, the focus error signal FES can be computed by (Sa+Sf)−(Sb+Se). As a result, when the light beam is projected to outside the main light receiving section 6a (or 6b) as well in a defocus state due to a displacement beyond the dynamic range, an output signal of the sub light receiving section 6e (or 6f) becomes intense, whereby the focus error signal FES becomes weaker. Thus, the focus error signal FES is intensified as a displacement from the just focus position increases, and thereafter abruptly weakens when the displacement exceeds a certain level. Therefore, by appropriately setting the sizes and arrangement of the main light receiving sections 6a and 6b and the sub light receiving sections 6e and 6f, only the focus error signal obtained from the recording/reproducing surface scanned can be used as an effective signal, while influences of return light from the recording/reproduction layers adjacent to the scanned layer can be eliminated.

Thus, theoretically, a precise focus error signal is obtained by the foregoing optical pickup device, and therefore, a recording/reproducing operation can be carried out with precision.

In assembling the pickup device, however, an assembly error naturally exists. In the focus adjusting operation, such an error makes the change of shape of the beam spot formed with return light on the light receiving element 6 different from the normal change thereof, thereby causing compensation of the focus error signal to become excessive or insufficient. As a result, it is impossible to obtain an adequate FES curve in recording/reproducing information to/from an optical disk having a plurality of recording/reproduction layers.

Further, in the case where an assembly error occurs, the return light to light receiving sections 6c and 6d for radial error signal production use is projected thereon with displacement from an ideal position. Therefore, the light receiving sections 6c and 6d need to be formed to greater sizes with all errors taken into consideration, so that the return light never fails to fall within the light receiving sections 6c and 6d, even when the displacement is greatest. On the other hand, a signal frequency band of the light receiving element is required to be higher, as capacity of an optical disk such as a DVD increases. To cope with such a requirement, however, it is necessary to reduce a size of the light receiving element, and this is contradictory to the aforementioned requirement of enlarging the light receiving element.

DISCLOSURE OF THE INVENTION

The present invention was made in light with the above-described problems, and the object of the present invention is to provide an optical pickup device capable of performing precise recording/reproducing operations with respect to an optical disk having a plurality of recording/reproduction layers even with assembly errors produced in assembling the pickup device, by optimizing shapes of sub light receiving sections for focus error signal production use and shapes of light receiving sections for radial error signal production use.

To achieve the aforementioned object, a first optical pickup device of the present invention, in which a light beam emitted from a light source is converged onto an optical recording medium through an optical system, and a shift which a focal point of the light beam has made from the optical recording medium is detected based on return light returning from the optical recording medium through the optical system, is arranged so as to comprise (1) main light receiving means having at least two main light receiving sections, each main light receiving section producing a main signal in accordance with a quantity of the return light incident thereon, (2) sub light receiving means having sub light receiving sections, when the shift of the focal point is beyond a dynamic range and the return light becomes incident also on outside the main light receiving sections and partly on the sub light receiving sections, each sub light receiving means producing a sub signal in accordance with a quantity of the part of the return light that is incident thereon, and (3) error signal producing means for producing a focus error signal by compensating the main signal by using the sub signal, and the optical pickup device is arranged so that the sub light receiving means adjusts an offset of the focus error signal due to an arrangement error of an optical element constituting the optical system, by using the sub signal.

In the first optical pickup device, the error signal producing means corrects the main signal obtained from the main light receiving sections by using the sub signal obtained from the sub light receiving sections, whereby in a great defocus state, the focus error signal abruptly decreases when the shift is beyond the dynamic range. With this, focus control suitable for recording/reproduction with respect to an optical disk having a plurality of recording/reproduction layers can be performed. Moreover, since the sub light receiving means adjusts an error of the focus error signal due to an arrangement error (an assembly error or the like) of the optical element by using the sub signal, it is easy to suppress the offset of the focus error signal even in the case where the shape of the light beam spot varies due to the arrangement error.

The foregoing optical pickup device is preferably, for adjustment by using the sub signal, arranged so that (i) the sub light receiving section has an effective light receiving area smaller than that of the main light receiving section, and (ii) the sub light receiving means includes level adjusting means for adjusting a level of the sub signal. The above arrangement (i) allows the sub signal to be adjusted by using a simple structure, and ensures that the light receiving element including the main and sub light receiving sections is not hindered from having better signal characteristics in a high frequency band.

Furthermore, in the case where the effective light receiving area of the sub light receiving sections is optimally set not less than 25 percent and not more than 80 percent of the effective light receiving area of the sub light receiving sections, compensation of the focus error signal is prevented from becoming excessive or insufficient in a great defocus state, irrelevant to presence or absence of the arrangement error.

To achieve the aforementioned object of the present invention, a second optical pickup device of the present invention, in which a light beam emitted from a light source is made to pass through a hologram element and is converged onto an optical recording medium through an optical element, and a shift which a focal point of the light beam has made from the optical recording medium is detected based on return light which returns from the optical recording medium and is diffracted by the hologram element, is arranged so as to comprise (1) main light receiving means having at least two main light receiving sections, each main light receiving means producing a main signal in accordance with a quantity of the return light incident thereon, the return light having a cross section shape in accordance with the shift which the focal point of the light beam has made from the optical recording medium, (2) sub light receiving means having sub light receiving sections, when the shift of the focal point is beyond a dynamic range and the return light becomes incident also on outside the main light receiving sections and partly on the sub light receiving sections, each sub light receiving means producing a sub signal in accordance with a quantity of the part of the return light that is incident thereon, and (3) error signal producing means for producing a focus error signal by compensating the main signal by using the sub signal, and the optical pickup device is arranged so that a first order diffractive angle of the hologram element is set substantially equal to a minimum diffractive angle in such an angle range as causes a first order diffracted light resulting on diffraction of the light beam from the light source by the hologram element to reach outside of a range of incidence to the optical element.

Incidentally, that "a first order diffractive angle is substantially equal to a minimum diffractive angle" means that the first order diffractive angle includes a minimum diffractive angle to which an angle corresponding to the arrangement error is added so that the arrangement error is taken in consideration.

The second optical pickup device is thus arranged so that the first order diffractive angle of the hologram element is set to a small degree in such a range that an emitted first order diffracted light does not enter the optical system (lens system) including the optical element (a collimator lens, an objective lens, and the like). Under presence of an arrangement error (an assembly error or the like), the variation of the light beam spot shape of the return light formed on both the light receiving sections during a focus adjustment operation differs depending on the first order diffractive angle. Therefore, by setting the first order diffractive angle small as described above, such a difference in variation of the light beam spot shape can be made small. This prevents compensation of the focus error signal from becoming excessive or insufficient, whereby satisfactory focus error characteristics (an FES curve) can be obtained in recording/reproducing information to/from an optical disk having a plurality of recording/reproduction layers.

The second optical pickup device is preferably arranged so that the first order diffractive angle represented by θ satisfies:

$$(D+r2+\Delta)/L1+r1/L2 \leq \tan\theta \leq (D+r2)/L1+r1/L2$$

where D represents a distance between the light source and the main and sub light receiving sections, r1 represents a radius of the hologram element, r2 represents a radius of an optical element closest to the hologram element, L1 represents a distance between the optical element and the main and sub light receiving sections in a direction parallel with an optical axis of the hologram element, L2 represents a distance between the hologram element and the main and sub light receiving sections in a direction parallel with the optical axis of the hologram element, and Δ represents an arrangement error of the optical element.

To achieve the aforementioned object of the present invention, a third optical pickup device, in which a light beam emitted from a light source is converged onto an optical recording medium through an optical system, and a shift which a focal point of the light beam has made from the optical recording medium and a shift of the light beam in an radial direction on the optical recording medium are detected based on return light returning from the optical recording medium through the optical system, is arranged so as to comprise (1) focus control means including at least two focus-error-detection-use light receiving sections for producing a first signal in accordance with a quantity of the return light incident thereon, the focus control means producing, based on the first signal, a focus error signal in accordance with the shift of the focal point of the light beam, (2) radial control means having at least two radial-error-detection-use light receiving sections for providing a second signal in accordance with a quantity of the return light incident thereon, the radial-error-detection-use light receiving sections being provided so as to have the focus-error-detection-use light receiving sections provided therebetween, the radial control means producing, based on the second signal, a radial error signal in accordance with the shift of the light beam in the radial direction, and the optical pickup device is arranged so that (i) the radial-error-detection-use light receiving sections are provided at least in regions to which the return light shifted due to an arrangement error of an optical element constituting the optical system is incident, and (ii) the radial-error-detection-use light receiving sections have effective light receiving areas, respectively, which are substantially equal to each other.

In the third optical pickup device, return light is surely received even in the case where the return light to be incident on the light receiving sections for radial error signal detection use is shifted due to an arrangement error, and moreover, the effective light receiving area can be minimized. By so doing, a difference between the respective effective light receiving areas of the light receiving sections for focus error signal detection use and that for radial error signal detection use can be made smaller, whereby deterioration of frequency characteristics is prevented. As a result, the light receiving element including both the light receiving sections is not hindered from having better frequency characteristics in a high frequency band. Further, since the effective receiving areas of the light receiving sections for the radial error signal detection use are set substantially equal to each other, the light receiving sections have the same frequency characteristics. Therefore, in reproducing information from an optical recording medium having a plurality of recording/reproduction layers, occurrence of radial offset can be prevented even in the case where stray light from a layer adjacent to a layer accessed is incident on the light receiving sections for radial error signal detection use.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) through 4(e) are explanatory views illustrating return light in a focus state, states in which an optical disk is closer, and states in which the optical disk is farther.

BEST MODES FOR CARRYING OUT THE INVENTION

The present invention will be explained in more detail with the following embodiments and controls, but the present invention should not be limited to the following embodiments.

First Embodiment

Figure 16:
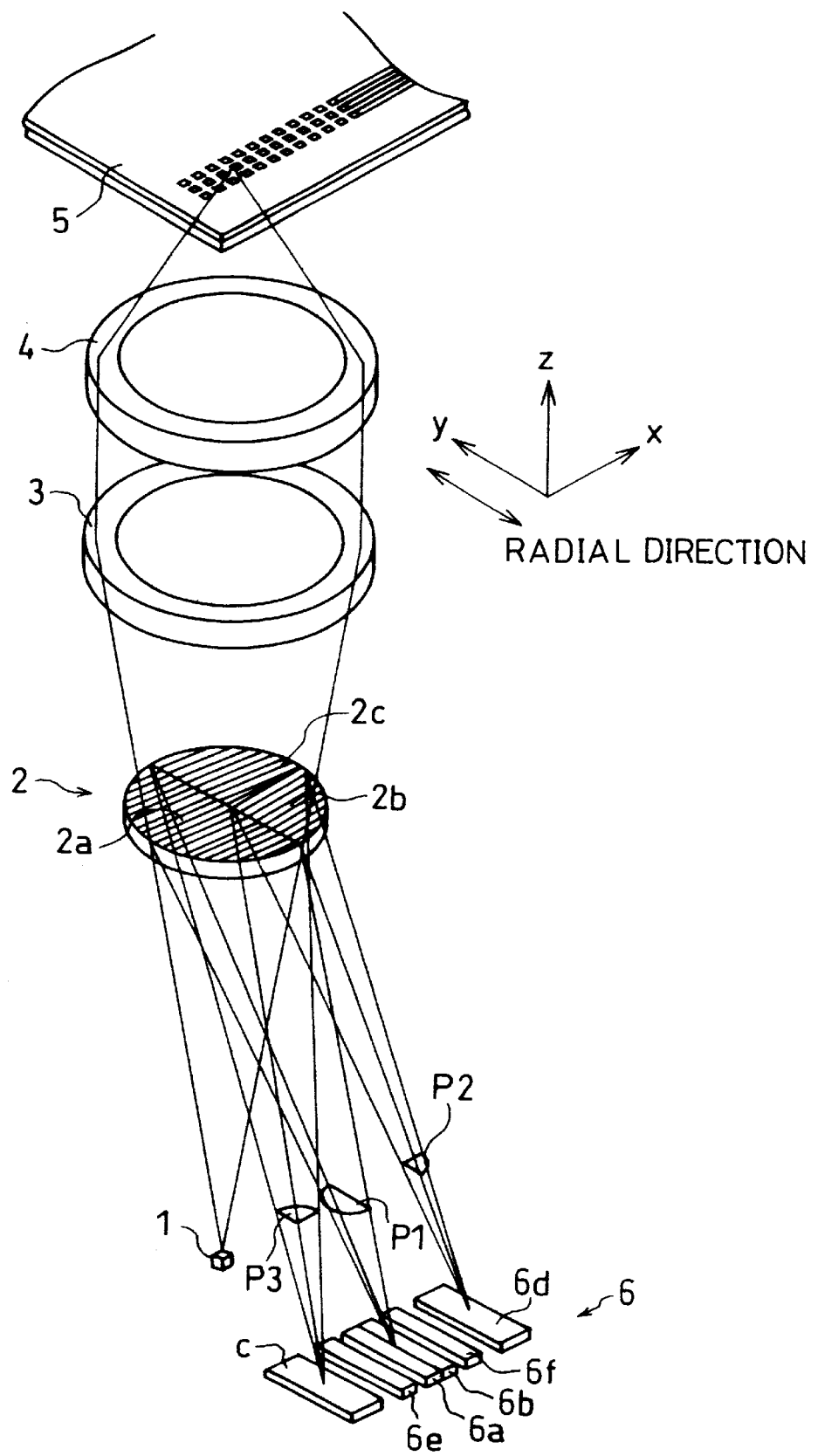
FIG. 16 is a perspective view illustrating an arrangement of a conventional optical pickup device.
Figure 17:
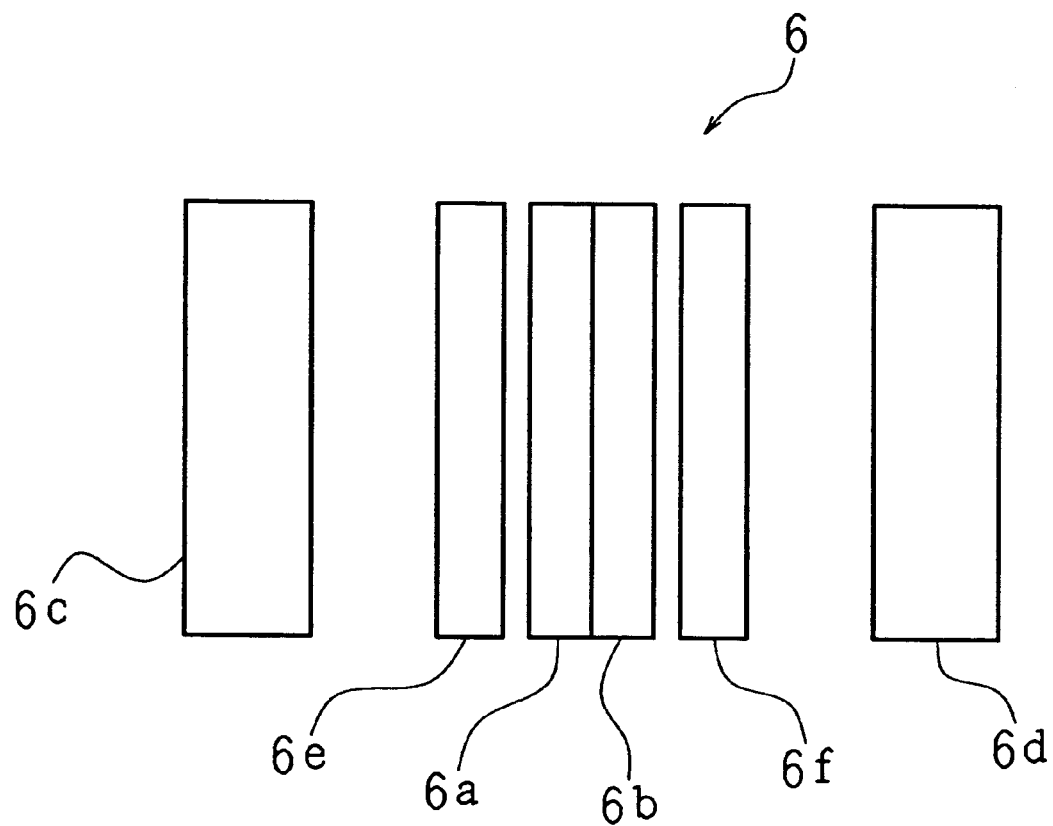
FIG. 17 is a plan view illustrating an arrangement of a light receiving element in the optical pickup device shown in FIG. 16.

First of all, the following description will explain a first embodiment of the present invention, while referring to FIGS. 1 through 11. The members having the same structure (function) as those shown in FIGS. 16 and 17 will be designated by the same reference numerals.

Figure 1:
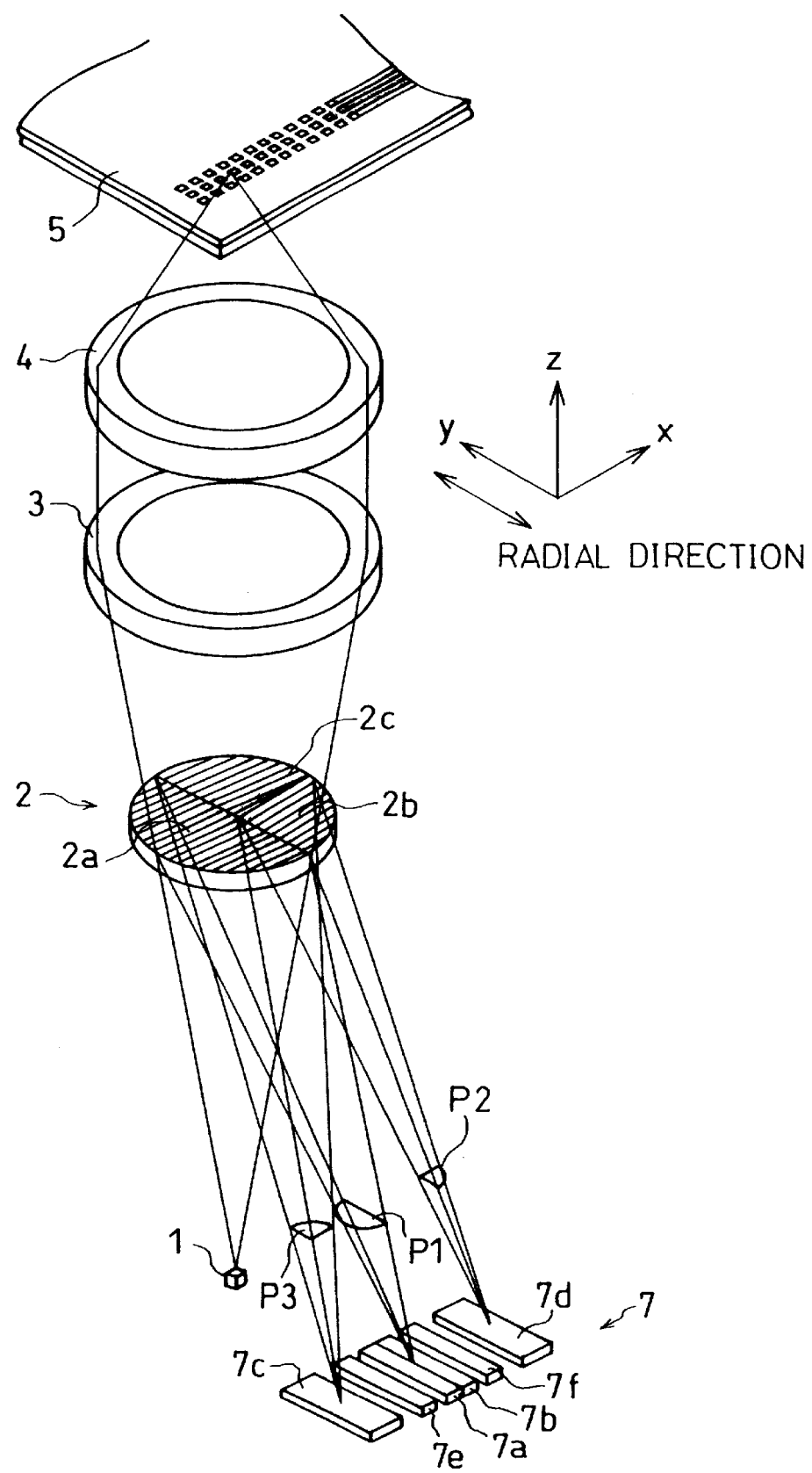
FIG. 1 is a perspective view illustrating a schematic arrangement of an optical pickup device of a first embodiment of the present invention.
Figure 2:
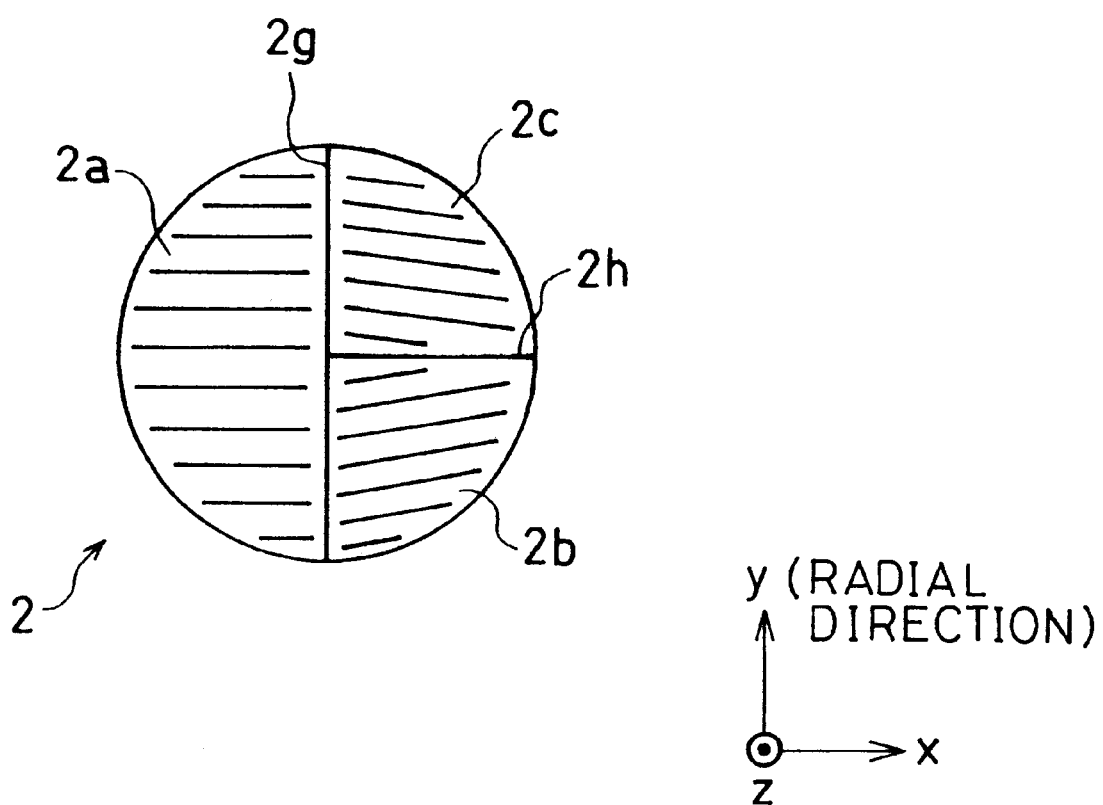
FIG. 2 is a schematic view illustrating an arrangement of a hologram element of the optical pickup device.
Figure 3:
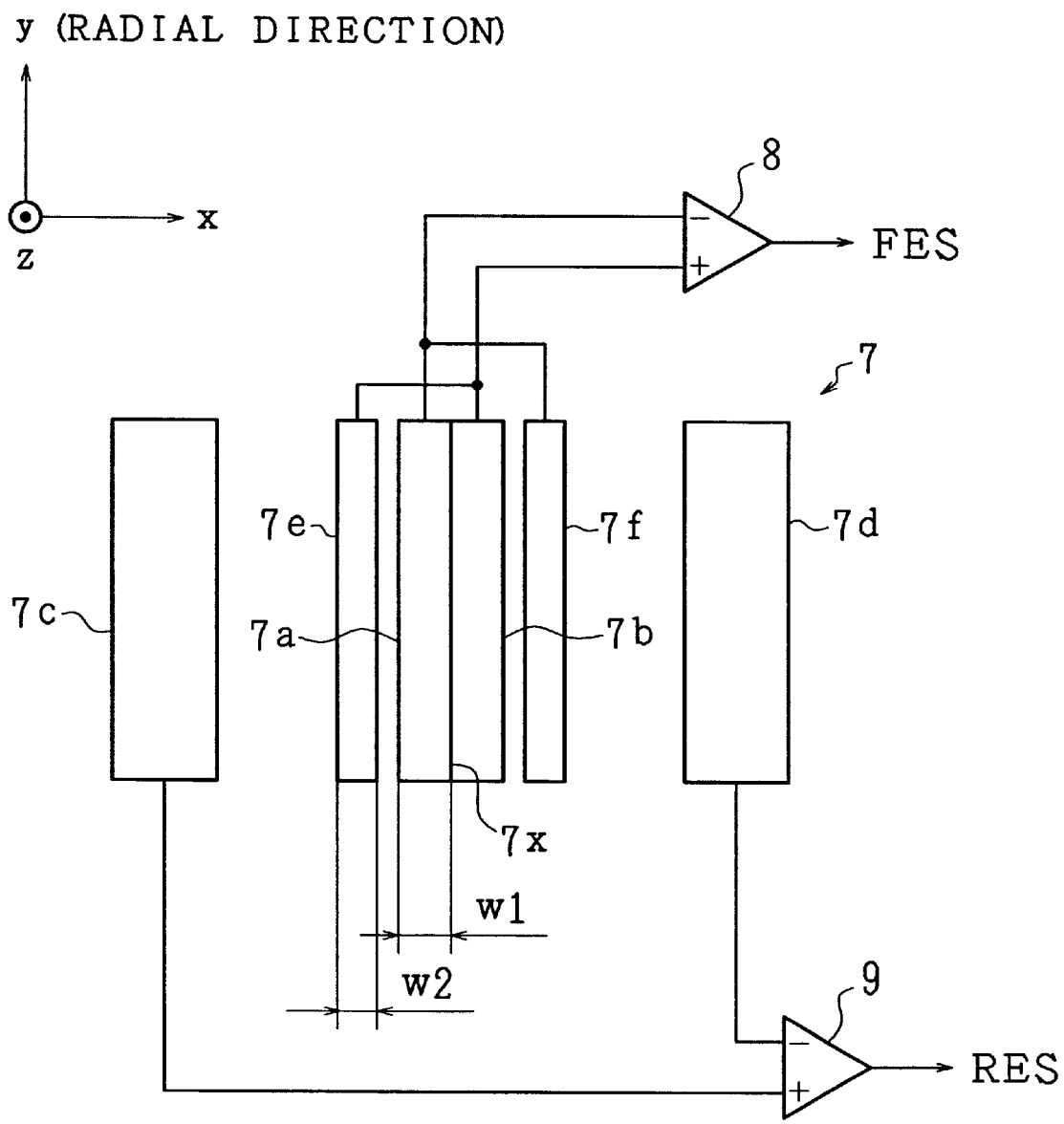
FIG. 3 is a plan view illustrating an arrangement of a light receiving element of the optical pickup device.

FIGS. 1 through 3 are views illustrating an arrangement of a pickup device in accordance with the first embodiment of the present invention. In FIG. 1, an optical disk 5 is, for example, a disk having two data layers at a sufficiently small distance (for example, 40 μm to 70 μm) as compared with a thickness of the substrate, which has been proposed as a double-layer digital versatile disk (DVD). Light emitted from a semiconductor laser 1 as a light source is diffracted by a hologram element 2, and a zeroth order diffracted light among the light thus diffracted is made to enter the objective lens 4 through a collimator lens 3, thereby being converged on the optical disk 5. Return light from the optical disk 5 is led to the hologram element 2 through the objective lens 4 and the collimator lens 3.

The hologram element 2 is, as shown in FIG. 2, divided into three division regions 2a, 2b, and 2c by a dividing segment 2g extending in a y direction corresponding to a radial direction of the optical disk 5, and a dividing segment 2h extending from a center of the dividing segment 2g in an x direction which is orthogonal to the radial direction of the optical disk 5, that is, corresponds to a track direction of the optical disk 5. Diffraction gratings are formed so as to correspond to the division regions 2a, 2b, and 2c, respectively.

As shown in FIG. 3, the receiving element 7 has six rectangular light receiving sections 7a, 7b, 7c, 7d, 7e, and 7f which are juxtaposed in the x direction corresponding to the track direction of the optical disk 5. The light receiving sections 7a and 7b in the middle are main light receiving sections for focus error detection use, which are formed by equally dividing one rectangle into the two sections by a dividing segment 7x extending in the y direction corresponding to the radial direction of the optical disk 5. The light receiving sections 7e and 7f disposed beside the main light receiving sections 7a and 7b, respectively, are sub light receiving sections for focus error compensation use. The light receiving sections 7e and 7f are positioned symmetrically with respect to the dividing segment 7x. A width W1 of the main light receiving sections 7a and 7b and a width W2 of the sub light receiving sections 7e and 7f in the x direction are set so as to satisfy W1>W2. On the other hand, the light receiving sections 7c and 7d provided outermost are for radial (tracking) error detection use, and are provided at predetermined distances to the sub light receiving sections 7e and 7f in the x direction, respectively. Each of the light receiving sections 7a, 7b, 7c, 7d, 7e, and 7f is formed long in the y direction corresponding to the radial direction.

Further, in the light receiving element 7, the light receiving sections 7a and 7f are connected with each other, while so are the light receiving sections 7b and 7e, so that a sum signal of output signals Sa and Sf outputted by the light receiving sections 7a and 7f, and a sum signal of output signals Sb and Se outputted by the light receiving sections 7b and 7e are obtained. A differential amplifier 8 (error signal producing means) finds a difference between the sum signals, and outputs a focus error signal FES (=(Sa+Sf)−(Sb+Se)).

On the other hand, in the light receiving element 7, a differential amplifier 9 finds a difference between output signals of the light receiving sections 7c and 7d, and outputs a radial error signal RES. Incidentally, in the case of an optical pickup device for use with DVDs, it is usual that the radial error signal RES is outputted by finding, not a difference between output signals as above, but a phase difference (delay) of output signals.

The following description will explain states of return light on the receiving element. FIGS. 4(a) through 4(e) are explanatory views explaining the states.

In a focus state as shown in FIG. 4(a), that is, when the light beam is just focused on a desired recording/reproducing surface of the optical disk 5, a return light diffracted by the division region 2a of the hologram element 2 forms a light beam spot P1 on the dividing segment 7x, while return lights diffracted by the division regions 2b and 2c form light beam spots P2 and P3 on the light receiving sections 7d and 7c, respectively. This is because such adjustment as makes the return light diffracted by the division region 2a form a light beam spot on the dividing segment 7x is previously carried out. In some cases, the light beam spots P1, P2, and P3 are formed with some offsets from centers of the light receiving sections in the y direction, so that position tolerance of the light receiving element 7 or wavelength variation may be absorbed by adjusting the position of the hologram element 2. In the focus state as described above, output signals of the main light receiving sections 7a and 7b and the sub light receiving sections 7e and 7f are zero.

In a defocus state, the output signals of the main light receiving sections 7a and 7b and the sub light receiving sections 7e and 7f are not zero. In the case where the optical disk 5 is slightly too far to the objective lens 4, the light beam spot P1 is enlarged in the main light receiving section 7b as shown in FIG. 4(b), while in the case where the optical disk 5 is slightly too close, the light beam spot P1 is enlarged in the main light receiving section 7a as shown in FIG. 4(d). Here, when the displacement of the objective lens 4 in the focusing direction is within a range indicated by the dynamic range Dy of the focus error signal FES, the focus error signal FES is produced based on the output signals Sa and Sb of the main light receiving sections 7a and 7b (FES=Sa−Sb).

On the other hand, when the displacement of the objective lens 4 is not within the dynamic range Dy and becomes greatly defocused, the light beam spot P1 protrudes out of the main light receiving section 7b or 7a as shown in FIG. 4(c) or 4(e), thereby falling also on the sub light receiving section 7e or 7f outside the main light receiving section 7a or 7b. In this case, the focus error signal FES is produced based on the output signals Sa, Sb, Se, and Sf of the main and sub light receiving sections 7a, 7b, 7e, and 7f (FES=(Sa+Sf)−(Sb+Se)).

The following description will explain the focus error signal FES of the present embodiment in more detail.

First of all, a control in which the width W1 of the main light receiving sections 7a and 7b and the width W2 of the sub light receiving sections 7e and 7f are equal (each area of the main light receiving sections 7a and 7b is equal to each area of the sub light receiving sections 7e and 7f) will be explained below.

Figure 5A:
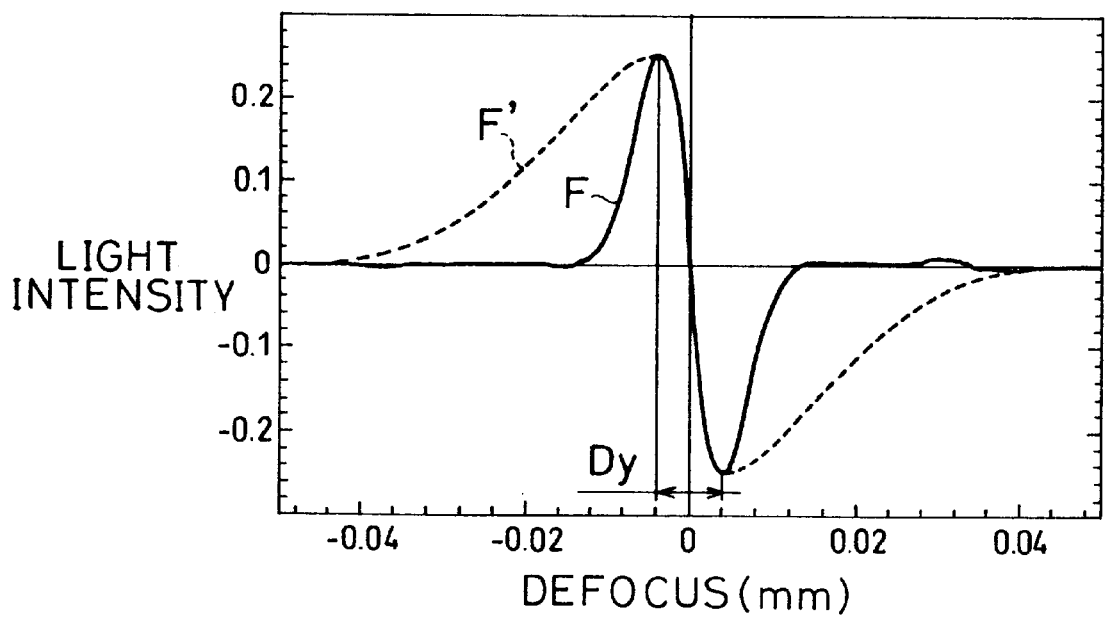
FIGS. 5(a) and 5(b) are graphs showing FES curves obtained by sub light receiving sections of a control.

In FIG. 5(a), an FES curve (F) of the control is indicated by a solid line, and an FES curve (F') in the case where the sub light receiving sections 7e and 7f are absent is indicated by a dot line. Until the light beam spot protrudes out of the main light receiving section 7a or 7b (within the dynamic range Dy), the FES curve F conforms to the FES curve F'. When the light beam spot further protrudes out of the main light receiving section 7a or 7b and reaches the sub light receiving section 7e or 7f, the output signal Se or Sf increases, whereby FES =(Sa+Sf)−(Sb+Se) rapidly decreases to zero.

More specifically, in the case where the optical disk 5 is displaced from a position at which the optical disk 5 is brought into focus (hereinafter referred to as a focus position) and becomes too far from the objective lens 4 with a displacement beyond the dynamic range Dy, light is received by the sub light receiving section 7f (output signal Sf) as well as the main light receiving section 7b (output signal Sb). On the other hand, in the case where the optical disk 5 is displaced from the focus position and approaches the objective lens 4 excessively with a displacement beyond the dynamic range Dy, light is received by the sub light receiving section 7e (output signal Se) as well as the main light receiving section 7a (output signal Sa). Further, in a defocus state in which the displacement of the optical disk 5 is greatly beyond the dynamic range Dy, a difference between (Sa+Sf) and (Sb+Se) rapidly decreases, since the sub light receiving section 7f or 7e receives light.

Consequently, the focus error signal FES based on (Sa+Sf)−(Sb+Se) is sharply converged to zero immediately outside the dynamic range Dy, as shown by the solid line curve (F) in FIG. 5 (a). Since the decreasing manner of the FES outside the dynamic range Dy changes by varying the shape of the light receiving sections 7e and 7f, the distances between the light receiving sections 7a and 7e and between the sections 7b and 7f, the FES curve can be rapidly converged to zero by optimizing such shapes and distances.

Figure 6A:
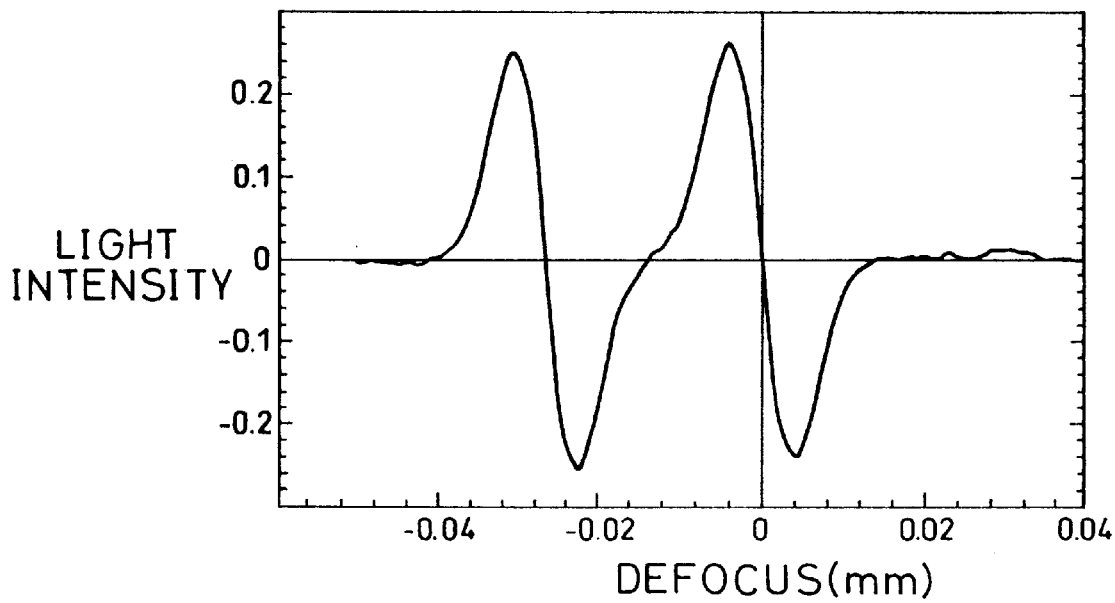
FIGS. 6(a) and 6(b) are graphs showing FES curves in the case where a double-layer disk is recorded/reproduced by an optical pickup device having the sub light receiving sections of the control.

In the case where the pickup device of the control is designed so as to be used for recording/reproducing information to/from an optical disk with a plurality of recording/reproduction layers such as a DVD (two layers), a satisfactory FES curve free from focus offset can be obtained from every layer, as shown in FIG. 6(a).

Figure 6B:
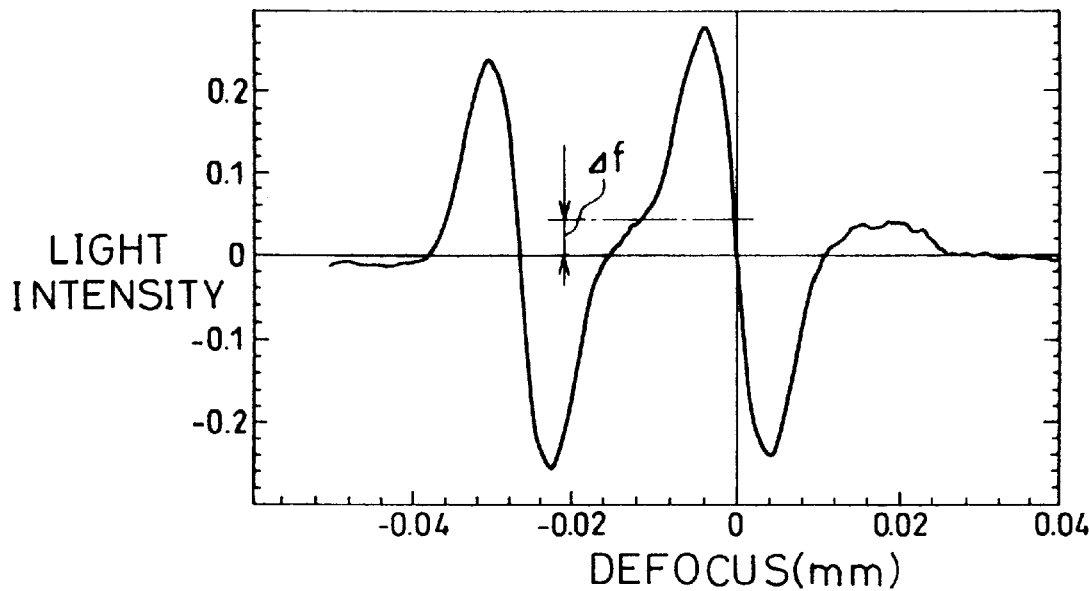
Figure 7:
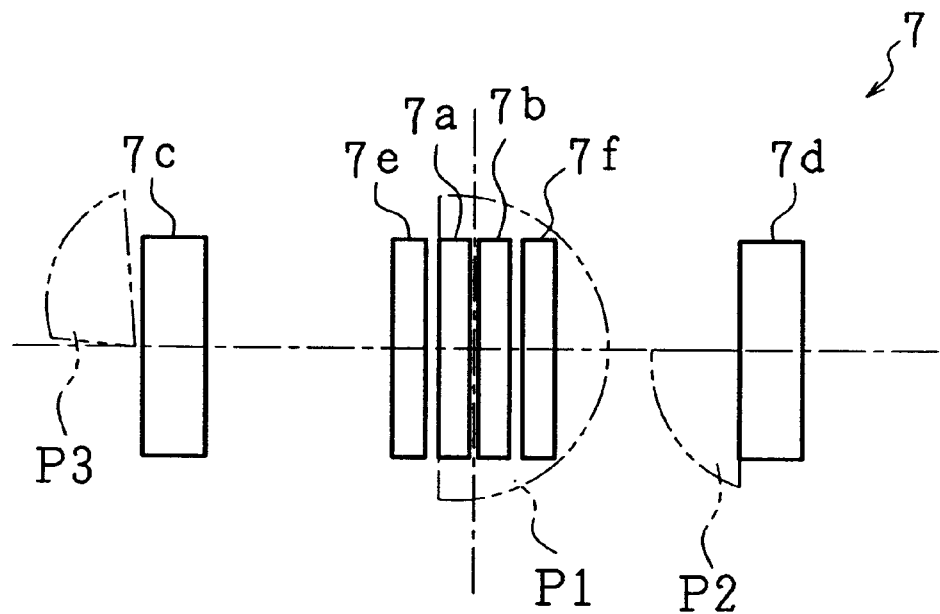
FIGS. 7(a) and 7(b) are explanatory views illustrating shapes of light beam spots on the sub light receiving sections of the control in a defocus state.
Figure 7:
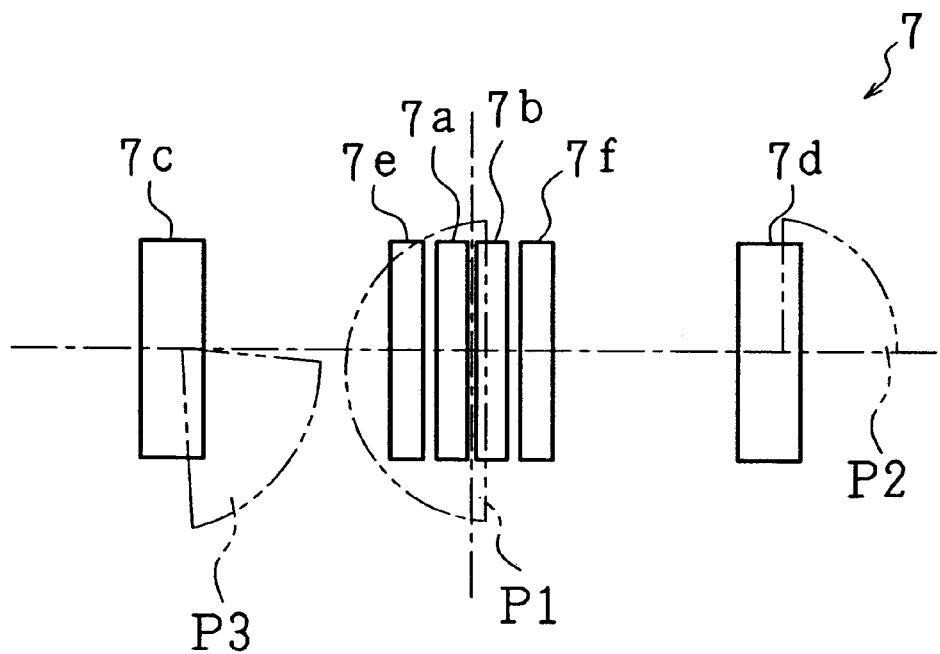

In the case where, however, in the pickup device of the control, the hologram element 2 is displaced in the x direction with respect to an optical axis determined by the semiconductor laser 1 and the collimator lens 3 upon assembling, the FES curve becomes as shown in FIG. 6(b). Normally, error occurring upon assembling or variation of the wavelength of the laser is adjusted by position adjustment of the hologram element 2 and rotation adjustment of the same with respect to the optical axis so that focus offset becomes zero upon focalization. Therefore, in FIG. 6(b) as well, no focus offset occurs when the recording medium is placed at the focus position.

Figure 5B:
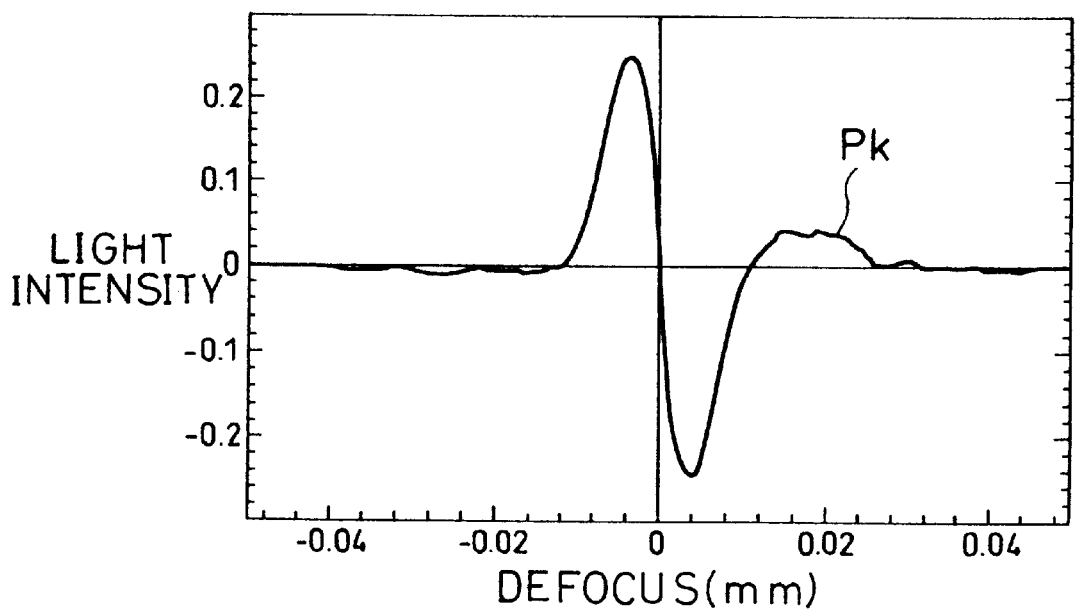

In the case where, however, the dividing segment 2g of the hologram element 2 does not cross the optical axis, the FES curve comes to have a high peak Pk, as shown in FIG. 5(b), in a region (right-hand side) in which the displacement of the optical disk is plus (hereinafter referred to as a FAR region). If such a pickup device of the control having an assembly error is used for recording/reproduction of an optical disk having a plurality of recording/reproduction layers, an FES obtained in this case has a great focus offset Δf as shown in FIG. 6(b), hence it is difficult to achieve precise focalization.

The following description will explain a cause of occurrence of the focus offset Δf to the control.

Figure 8A:
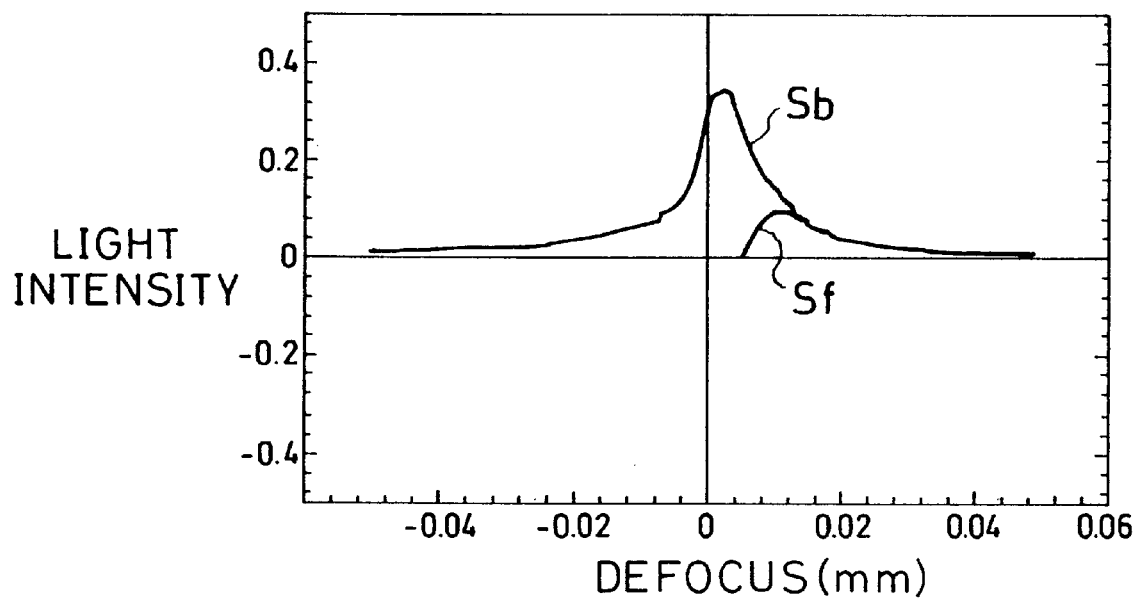
FIGS. 8(a) and 8(b) are explanatory views of output signals of each light receiving section of the control.
Figure 8B:
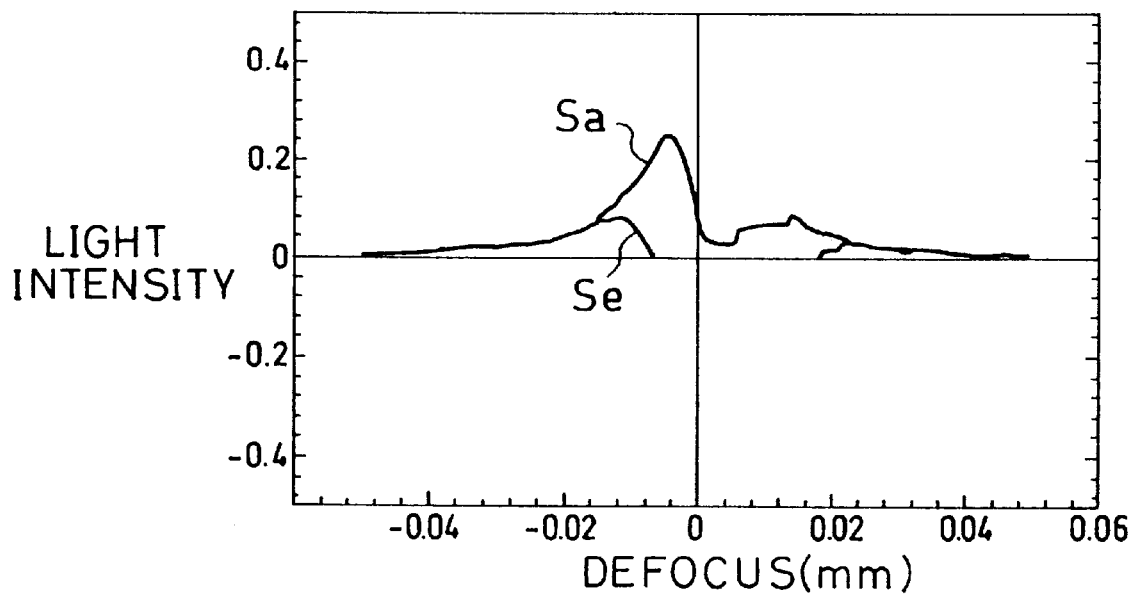

FIGS. 7(a) and 7(b) show a shape of a light beam spot P1 formed on the light receiving sections 7a, 7b, 7e, and 7f, and shapes of light beam spots P2 and P3 formed on the light receiving sections 7c and 7d. FIGS. 8(a) and 8(b) show signals Sa, Sb, Se, and Sf which are output signals of the light receiving sections 7a, 7b, 7e, and 7f. FIGS. 7(a) and 7(b) illustrate the light beam spots obtained in the case where the dividing segment 2g is offsetted in the +x direction, and as shown therein, the light beam spot P1 in the defocus state protrudes out to the main light receiving section 7a side by crossing the center of the light receiving element 7. Particularly, in the case where the optical disk 5 is displaced so as to become farther excessively from the objective lens as shown in FIG. 7(a), the light beam spot P1 more greatly protrudes out from an appropriate side to the other side by crossing the dividing segment 2g, as compared with the light beam spot P1 in the case where the optical disk 5 is displaced so as to approach the objective lens excessively as shown in FIG. 7(b). If there is no assembly error, for example, no return light is made incident to the main light receiving section 7a even in the defocus state in which the optical disk is displaced so as to become farther excessively. In contrast, if there is an assembly error, return light becomes incident to the main light receiving section 7a as the defocus state is gravitated due to the assembly error.

Since the focus error signal FES based on an actual output signal is found by computation of (Sa+Sf)−(Sb+Se), it is also found by computation of (Sa−Se)−(Sb−Sf) which is a modification of the foregoing formula. Therefore, in the case of FIG. 7(a), even if the focus error signal FES is compensated with Sf so that (Sb−Sf) becomes zero, it constitutes excessive compensation since Sa is increased by incidence of the return light to the main light receiving section 7a, and as a result, the focus error signal FES does not become zero.

Moreover, the output signals Sb and Sf vary as shown in FIG. 8(a). According to the figure, (Sb−Sf) becomes substantially zero in the FAR (right-hand side) region of the figure. In a NEAR (left-hand side) region of the figure in which the optical disk approaches the objective lens excessively and the displacement of the optical disk is minus, though gradually converted toward zero, (Sb−Sf) remains slightly greater than zero. On the other hand, the output signals Sa and Se vary as shown in FIG. 8(b). According to the figure, (Sa−Se) is substantially zero in the NEAR region, while it does not become zero in the FAR region in a defocus state with a displacement of not less than 10 μm, but has sufficiently greater than zero. (Sa−Se) is finally converged to zero in a defocus state with a displacement of not less than 20 μm.

Therefore, in the case, like the control, where each area of the main light receiving sections 7a and 7b and each area of the sub light receiving sections 7e and 7f are equal, the FES expressed by (Sa−Se)−(Sb−Sf) has a high peak in the FAR region, while it gradually drops and becomes more or less greater than zero.

From what has been describe above, the following two measures can be thought of as measures to prevent excessive compensation:

(1) to decrease the compensation by the sub light receiving sections 7e and 7f; and (2) to make the light beam spot less protrude out from the appropriate side to the other side by crossing the border between the main light receiving sections 7a and 7b.

In the present embodiment, each area (effective light receiving area) of the sub light receiving sections 7e and 7f is set smaller than each area (effective light receiving area) of the main light receiving sections 7a and 7b so as to reduce the compensation by the sub light receiving sections. Therefore, such excessive compensation can be prevented, and a satisfactory FES curve can be obtained.

Figure 9A:
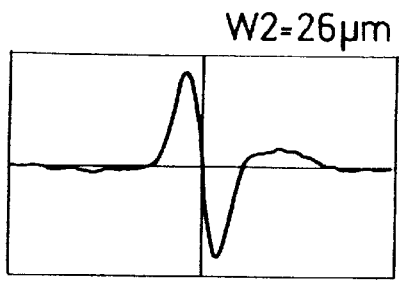
FIGS. 9(a) through 9(h) are graphs showing FES curves obtained in the case where a width of each sub light receiving section is varied.
Figure 9E:
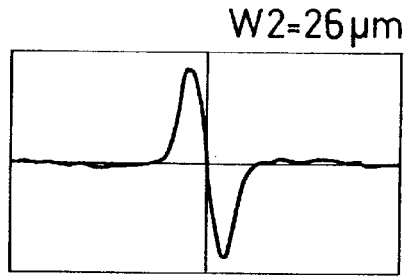
Figure 9B:
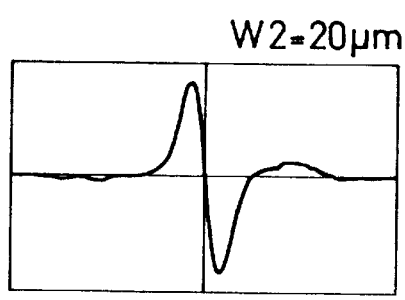
Figure 9F:
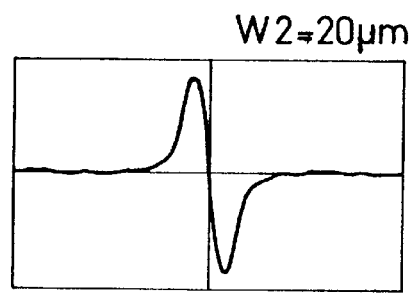
Figure 9C:
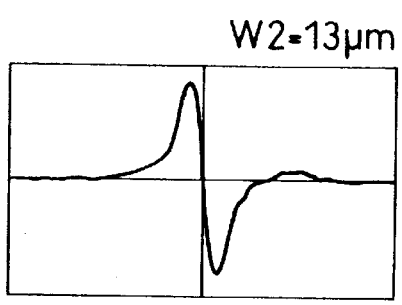
Figure 9G:
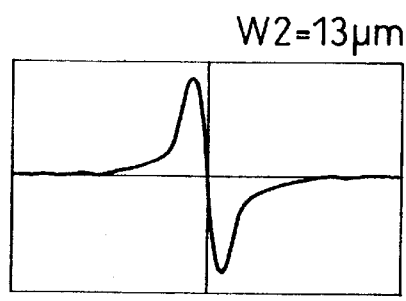
Figure 9D:
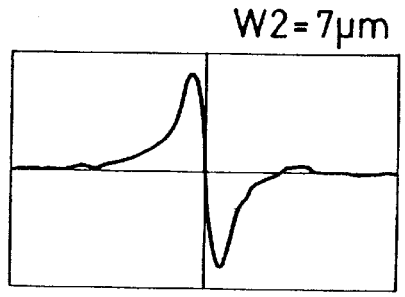
Figure 9H:
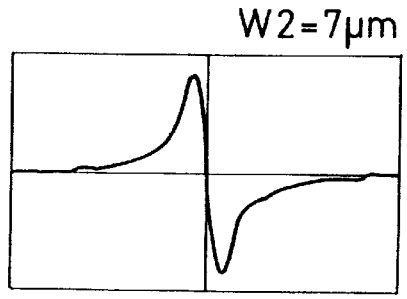

FIGS. 9(a) through 9(h) show FES curves obtained when the width of the sub light receiving sections 7e and 7f is varied. FIGS. 9(a) through 9(d) show FES curves in the case where a certain assembly error occurs, while FIGS. 9(e) through 9(h) show FES curves when the light receiving sections are desirably assembled. The FES curves of FIGS. 9(a) and 9(e), the FES curves of FIGS. 9(b) and 9(f), the FES curves of FIGS. 9(c) and 9(g), and the FES curves of FIGS. 9(d) and 9(h) are obtained when the width W2 of the sub light receiving sections 7e and 7f is 26 µm, 20 µm, 13 µm, and 7 µm, respectively.

Incidentally, the width W1 of the main light receiving sections 7a and 7b is set to 25 µm.

In FIGS. 9(a) through 9(d), it is seen that in the case where there is an assembly error, the FES curve has a lower peak in the FAR region as the width of the sub light receiving sections 7e and 7f is smaller. On the other hand, it is seen that in the case of the desirable assembling, about 20 µm (about 80 percent of the width of the main light receiving sections 7a and 7b) is optimum. If the width 2 is set smaller than 20 µm, the FES curve has a dull fall in a region of the graph corresponding to a defocus state (hereinafter referred to as defocus region), and does not have a high peak, but a focus offset, though very slightly, occurs in the case where a distance between the recording/reproduction layers is small. Further, in the case of the width W2 is set to 7 µm, the focus offset in the case of desirable assembling is considerably great, and particularly when the width W2 is less than 25 percent of the width W1 of the main light receiving sections 7a and 7b, the offset seriously matters.

In an actual optical pickup device, an assembly error necessarily exists. Therefore, it is necessary to take a range of an error into consideration even in the case where the error is small (or no error exists), so as to determine a generally optimal width of the sub light receiving sections 7e and 7f. More concretely, it is desirable that 0.25W1≦W2≦0.8W1 is satisfied, where W1 represents the width of the main light receiving section and W2 represents the width of the sub light receiving section.

Figure 10A:
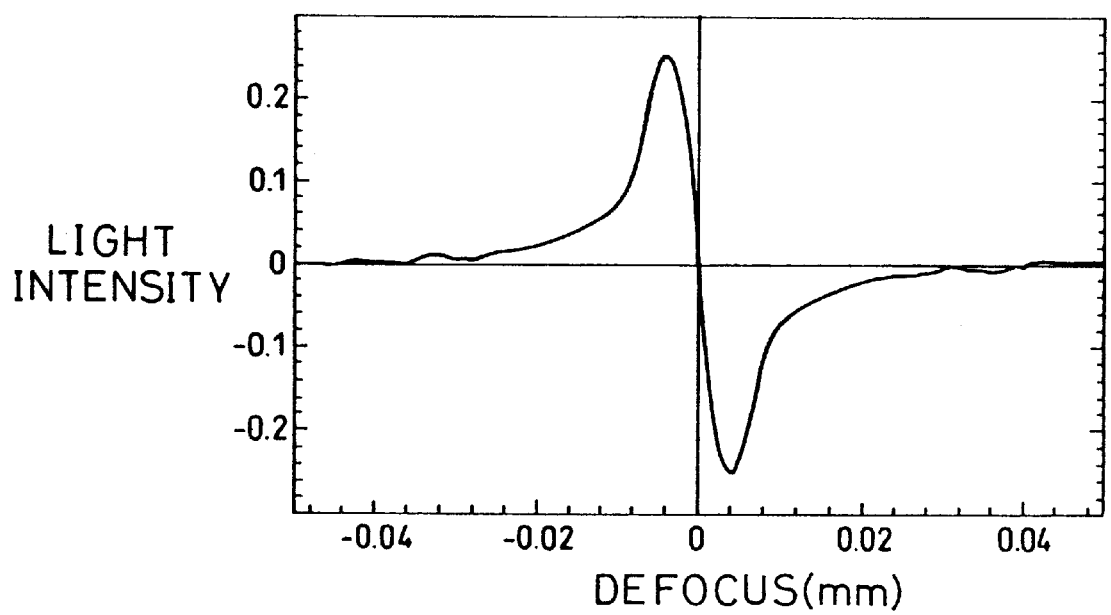
FIGS. 10(a) and 10(b) are graphs showing FES curves in the case where an area of each main light receiving section is double of an area of each sub light receiving section.
Figure 10B:
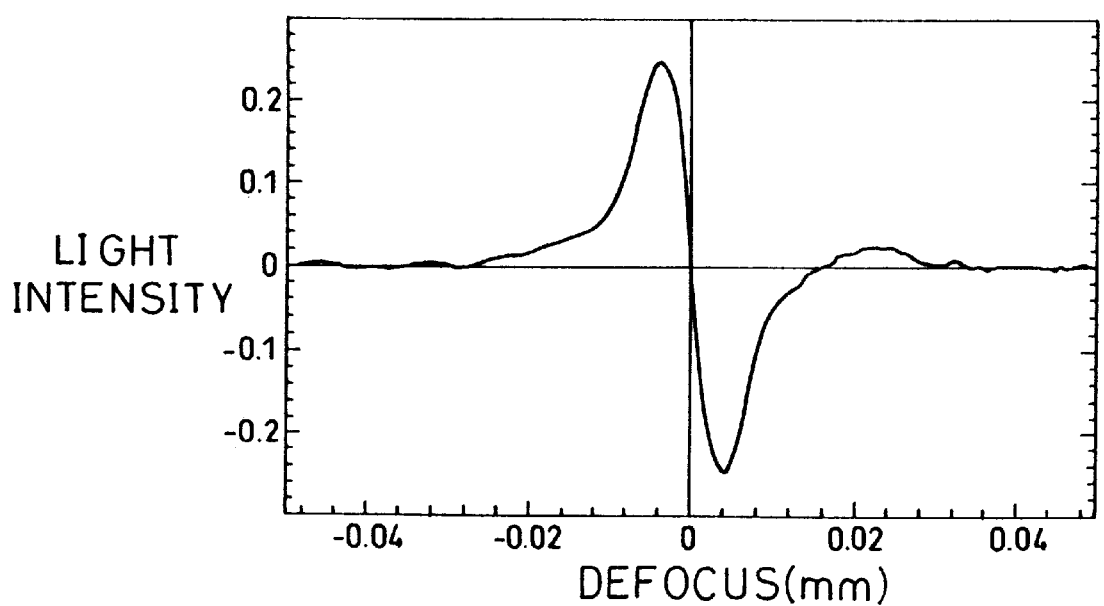
Figure 11:
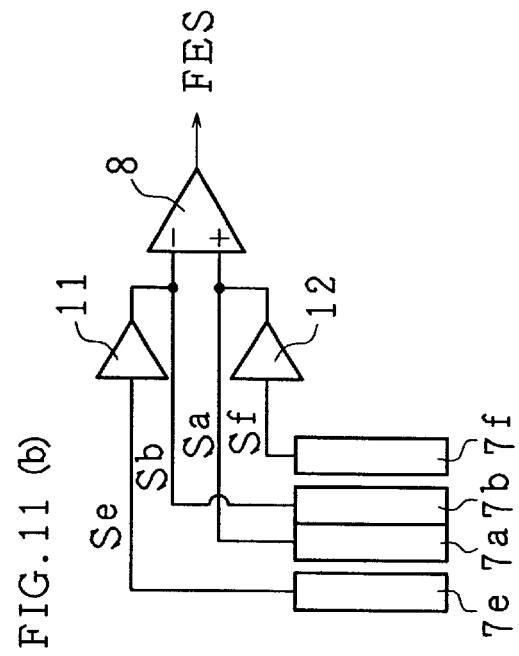
FIGS. 11(a) through 11(d) are explanatory views illustrating various arrangements other than an arrangement in which the sub light receiving sections are narrowed.
Figure 11:
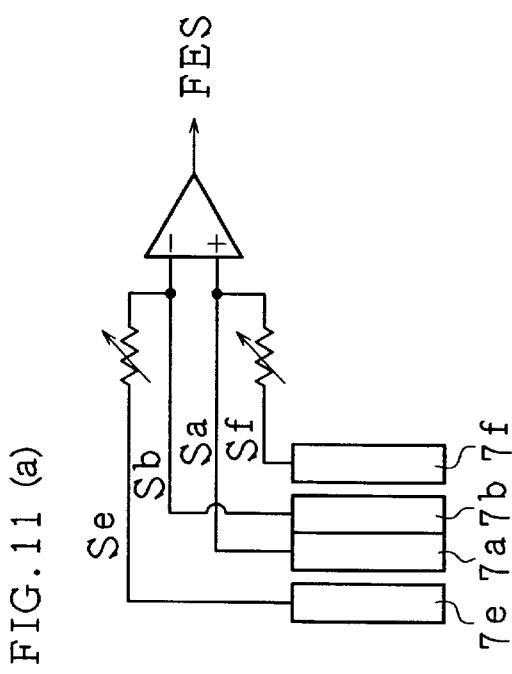
Figure 11:
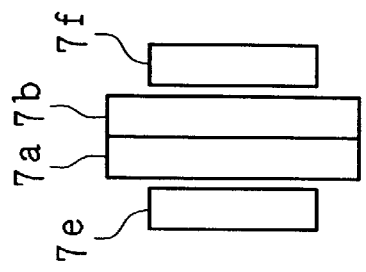
Figure 11:
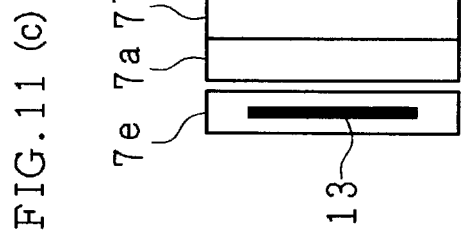

FIGS. 10(a) and 10(b) show FES curves in the case where the width W2 of the sub light receiving sections 7e and 7f is about half of the width W1 of the main light receiving sections 7a and 7b (W2=2×W1). More specifically, FIG. 10(a) shows an FES curve in the case where the light receiving sections are desirably assembled, while FIG. 10(b) shows an FES curve in the case where an assembly error exists (the assembly here includes installation of the light receiving sections in the optical pickup device). In both the cases, the focus offset in a region of the graph corresponding to a great defocus state is considerably suppressed.

Incidentally, in these foregoing examples, the excessive compensation is prevented by forming the sub light receiving sections 7e and 7f so as to have a smaller width as compared with the width of the main light receiving sections 7a and 7b, but the arrangement of the optical pickup device of the present invention is not limited to this, and it may be arranged as follows. In the following arrangements, the width of the sub light receiving sections 7e and 7f is set substantially equal to that of the main light receiving sections 7a and 7b.

(1) Levels of the output signals of the sub light receiving sections 7e and 7f are adjusted by a variable register 10 shown in FIG. 11(a), or amplifiers 11 and 12 shown in FIG. 11(b), and the adjusted signals are added to the output signals Sb and Sa, respectively. In this case, the focus error signal FES is calculated by using the following formula:

$$FES=(Sa-K\times Se)-(Sb-K\times Sf)$$

where K is a compensation coefficient, which is determined in accordance with a resistance of the register 10 or gains of the amplifiers 11 and 12.

Note that in the case where the variable resistor 10 is used, it is necessary to provide a current/voltage converter, not shown, before the variable resistor 10.

(2) Sensitivity of the sub light receiving sections 7e and 7f is degraded (diffusion temperature and diffusion depth upon formation of the light receiving element 7 are changed).

(3) Each effective light receiving area of the sub light receiving sections 7e and 7f is reduced by providing a light blocking belt 13 such as a mask made of metal on each, as shown in FIG. 11(c). Such a mask made of metal is easily formed on the light receiving element 7 by patterning, upon manufacture of the light receiving element 7. Masking is effective, since it is difficult to form the light blocking belt 13 by diffusing or the like on such small light receiving sections as have a width in a µm order.

(4) To cope with variation of the shape of the light beam spot due to an assembly error or the like, the sub light receiving sections 7e and 7f are shortened, as shown in FIG. 11(d). Here, each area of the sub light receiving sections 7e and 7f is set not less than 25 percent and not more than 80 percent of each area of the main light receiving sections 7a and 7b. Further, the sub light receiving sections 7e and 7f are desirably formed symmetric in the y direction with respect to the central point of the dividing segment 7x. Since the light beam spots formed on the sub light receiving sections 7e and 7f are great in area, the sub light receiving sections 7e and 7f surely receive return light even if positions of the light beam spots are offsetted in a lengthwise direction of the sub light receiving sections 7e and 7f. Therefore, shortening the sub light receiving sections 7e and 7f causes no inconvenience.

Second Embodiment

Figure 12:
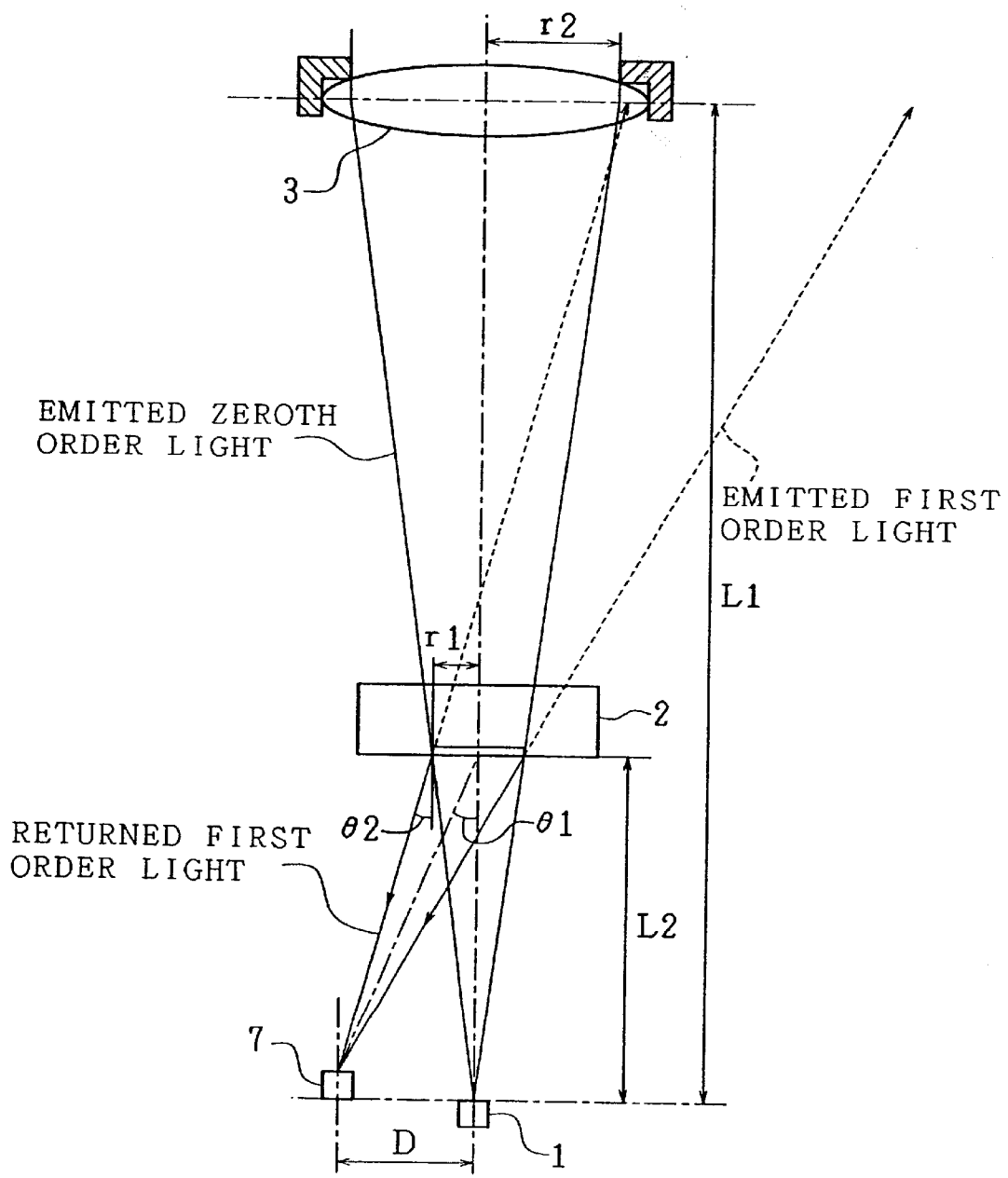
FIGS. 12 is a front view illustrating major parts of an optical pickup device in accordance with a second embodiment of the present invention.
Figure 13:
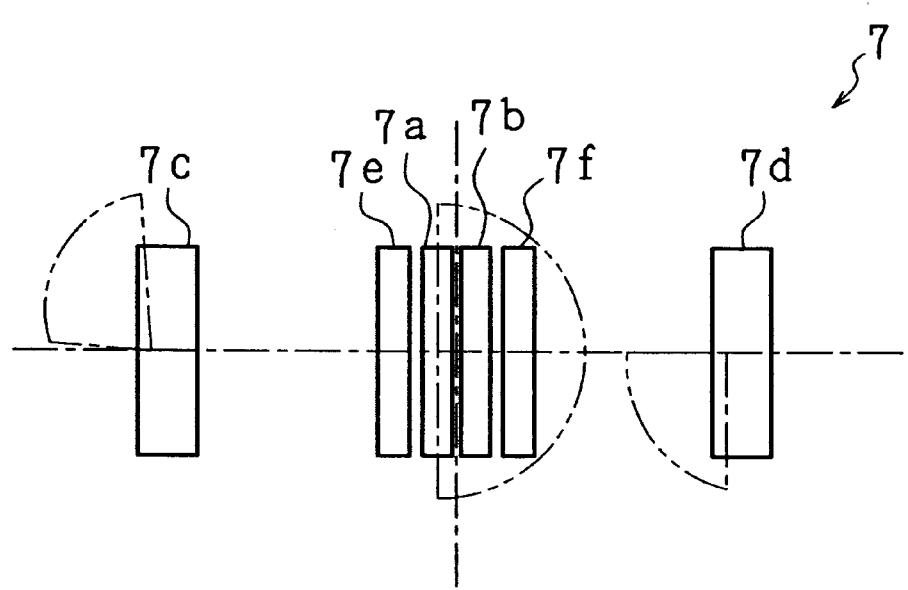
FIGS. 13(a) through 13(b) are explanatory views illustrating shapes of light beam spots formed on the sub light receiving sections in the case where a diffractive angle is varied.
Figure 13:
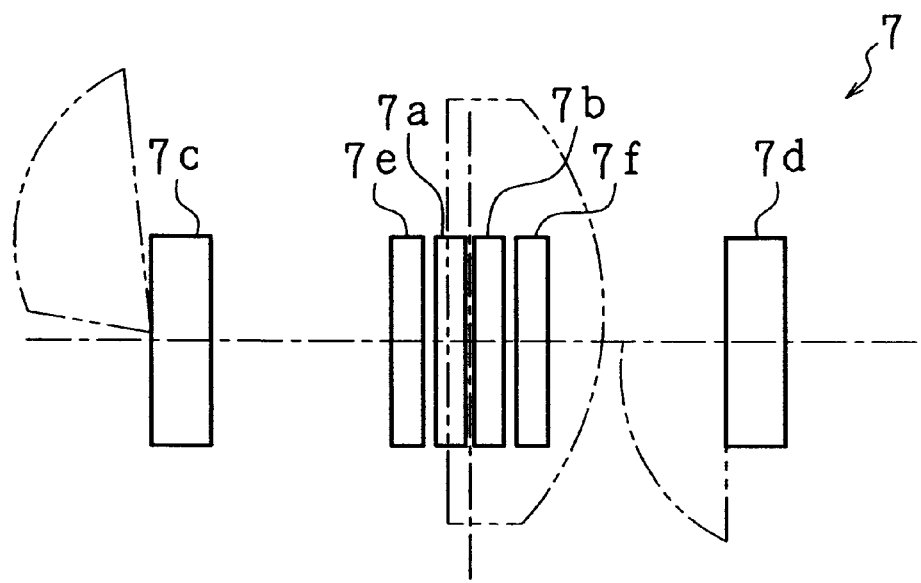

Next, the following description will explain a second embodiment of the present invention, while referring to FIGS. 12 and 13. The members having the same structure (function) as those in the first embodiment will be designated by the same reference numerals.

An optical pickup device of the second embodiment is arranged so as to realize the following measure among those which are mentioned as measures for preventing excessive compensation in the description of the first embodiment: to make the light beam spot less protrude from the appropriate side to the other side by crossing the border between the main light receiving sections 7a and 7b in the case where there is an assembly error.

FIG. 12 shows a schematic arrangement of the optical pickup device. In FIG. 12, for conveniences' sake, only the semiconductor laser 1, the light receiving element 7, the hologram element 2, and the collimator lens 3 are shown. In the vicinity of the hologram element 2, on a side thereof to the semiconductor laser 1, a cover glass 14 is provided.

A diffractive angle of the hologram element 2 is set so that a first order diffracted light (returned first order light), among return light from the optical disk, is made incident onto the light receiving element 7. Further, regarding a light beam emitted from the semiconductor laser 1, not only a zeroth order light but also a first order diffracted light (emitted first order light) are also produced, going toward the collimator lens 3.

In an optical pickup device having such an optical system, the shape of the optical beam spot formed on the light receiving element 7 more greatly varies due to an assembly error or the like, as the diffractive angle θ1 of the hologram element 2 is greater. Therefore, to cause the light beam spot to less protrude out of the appropriate main light receiving section to the other by crossing the border therebetween, the diffractive angle θ1 may be made smaller.

It is, however, not preferable that the diffractive angle θ1 is decreased too much, since in such a case the emitted first order diffracted light enters the collimator lens 3, and produces unnecessary light onto the optical disk. Therefore, by decreasing the diffractive angle to such a level that the emitted first order diffracted light does not enter optical elements behind the hologram element 2 like the collimator lens 3, a satisfactory pickup device which satisfies both the requirements can be provided.

The following description will concretely explain the aforementioned optical pickup device.

In FIG. 12, r1 and r2 represent a radius of the hologram element 2 and a radius of the collimator lens 3, respectively, θ1 represents a diffractive angle of return light diffracted by the hologram element 2, and θ2 represents an angle at which a line connecting the light receiving element 7 and the closest position in the diffraction plane of the hologram element 2 crosses a direction parallel with the optical axis which crosses the hologram element 2. Further, L1 represents a distance between the light receiving element 7 and the collimator lens 3 (distance in a direction parallel with the optical axis of the collimator lens 2), and L2 represents a distance between the light receiving element 7 and the hologram element 2 (distance in a direction parallel with the optical axis of the hologram element 2). In addition, D represents a distance between the light receiving element 7 and the semiconductor laser 1 (distance in a direction parallel with a surface of the hologram element 2).

Regarding the optical pickup device thus arranged, the following relations are established:

$$\tan \theta 1 = D/L2$$

$$\tan \theta 2 = (D-r1)/L2$$

From these formulas, the following formula can be obtained:

$$\tan \theta 1 = (D - r1)/L2 + r1/L2 \quad (1)$$

$$= \tan \theta 2 + r1/L2$$

Here, a condition for preventing the emitted first order diffracted light from entering the collimator lens 3 can be expressed as follows:

$$L1 \times \tan \theta 2 \geq D + r2$$

$$\tan \theta 2 \geq (D+r2)/L1 \quad (2)$$

From the formulas (1) and (2), a condition that θ1 should satisfy is found as follows:

$$\tan \theta 1 \geq (D+r2)/L1 + r1/L2 \quad (3)$$

Therefore, by setting the diffractive angle θ1 so as to satisfy the foregoing formula, the emitted first order diffracted light does not enter the collimator lens 3.

Here, since the diffractive angle θ1 is preferably as small as possible as described above, it is desirable that the following condition is satisfied, as clear from the foregoing formula (3):

$$\tan \theta 1 = (D+r2)/L1 + r1/L2$$

Since, however, an assembly error or the like exists, the diffractive angle θ1 is more preferably set so as to satisfy the following expression:

$$(D+r2+\Delta)/L1 + r1/L2 \geq \tan \theta 1 \geq (D+r2)/L1 + r1/L2$$

where Δ represents an assembly error estimated.

FIGS. 13(a) and 13(b) show how a light beam spot (indicated by two-dot chain lines in the figures) formed on the light receiving element 7 varies when the diffractive angle of the hologram element 2 is varied to double. FIG. 13(a) shows a light beam spot in the case where the diffractive angle is about 15°, while FIG. 13(b) shows a light beam spot in the case where the diffractive angle is about 30°. In the case of FIG. 13(a) where the diffractive angle is smaller, the light beam spot protrudes less from the border between the main light receiving sections 7a and 7b to which the light beam spot is to fall on. As a result, the focus offset can be suppressed, whereby a satisfactory FES curve can be obtained.

Therefore, in the present embodiment, the compensation of the focus error signal is prevented from becoming excessive or insufficient, and consequently, stable focus control can be performed in recording/reproduction of an optical disk having a plurality of recording/reproduction layers.

Dimensions of members of the optical pickup device shown in FIG. 12 can be set, for example, as follows.

The radius r1 of the hologram element 2 is set to 0.39 mm, while a thickness of a supporter 2d of the hologram element 2 is set to 1.0 mm. L2 is set to 3.031 mm, while D is set to 0.8 mm. A distance between a light emitting point of the semiconductor laser 1 and a light receiving surface of the light receiving element 7 is set to 0.38 mm. Further, a distance between a surface of the hologram element 2 on the semiconductor laser 1 side and the light receiving surface of the light receiving element is set to 2.57 mm as an optical path in the air. As the cover glass 14, glass whose thickness is set to 0.25 mm and whose refractive index thereof is set to 1.48 is used.

Third Embodiment

Figure 14:
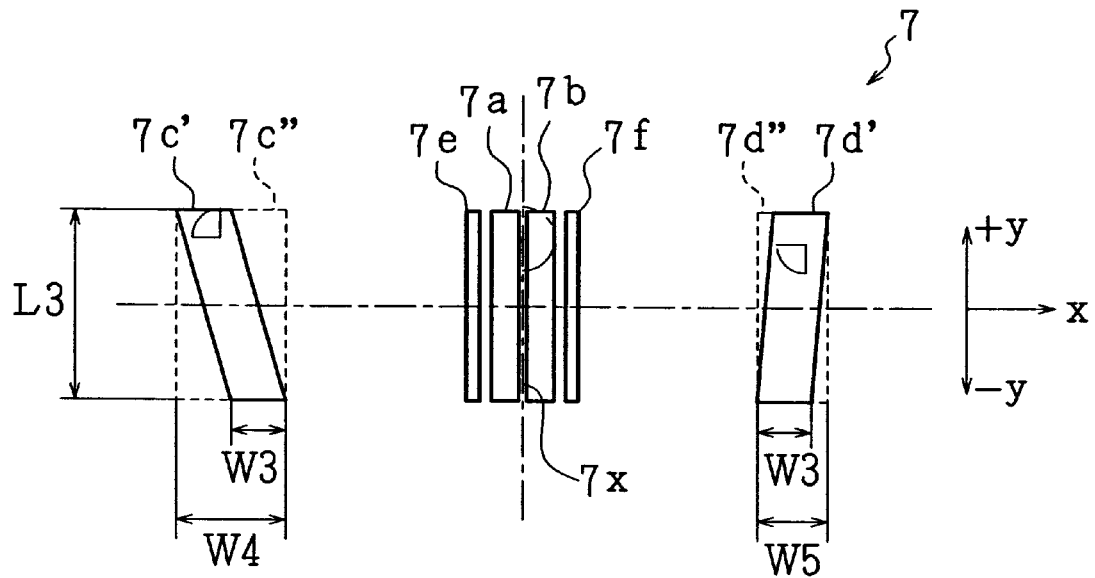
FIGS. 14(a) and 14(b) are explanatory views illustrating shapes of light receiving sections in accordance with a third embodiment of the present invention, and shapes of light beam spots formed on sub light receiving sections thereof.
Figure 14:
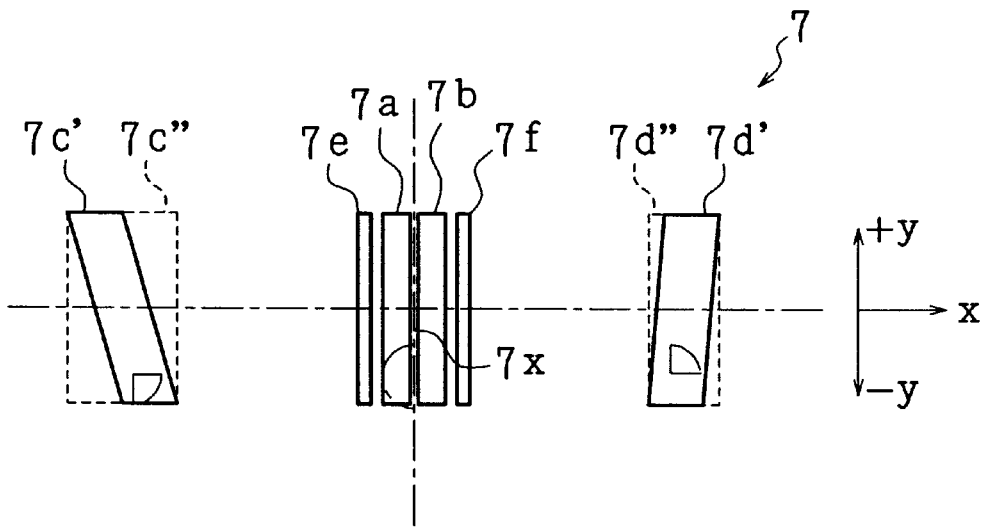
Figure 15:
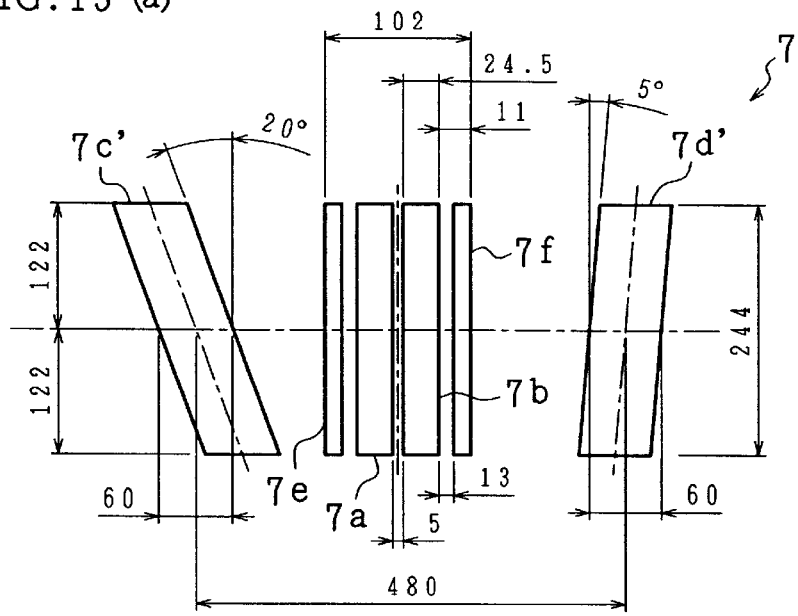
FIG. 15(a) is a plan view of a light receiving element in accordance with the third embodiment, showing example dimensions thereof.
FIG. 15(b) is a plan view illustrating an example arrangement of a hologram element and the light receiving element.
Figure 15:
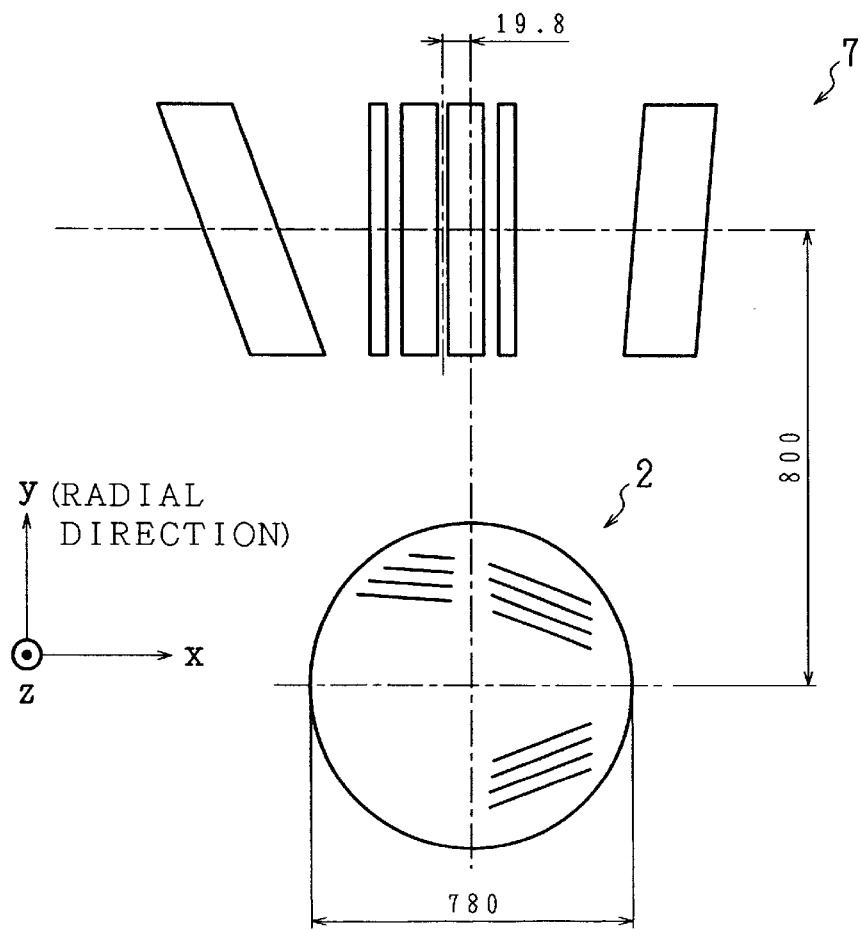

The following description will explain a third embodiment of the present invention, while referring to FIGS. 14 and 15. The members having the same structure (function) as those in the first embodiment will be designated by the same reference numerals.

An optical pickup device of the present embodiment has light receiving sections 7c' and 7d' for radial error detection use as shown in FIGS. 14(a) and 14(b), which differ in shape from the light receiving sections 7c and 7d (see FIG. 3) for radial error detection use in the optical pickup device of the first embodiment.

FIGS. 14(a) and 14(b) show shapes of light beam spots (indicated by two-dot chain lines in the figures) in the case where return light falls on the light receiving element 7 with maximum offsets in +y direction and −y direction, respectively, which are caused by an assembly error intrinsic in the optical system or the like. These figures also show the return light in a defocus state with a certain displacement.

To make the light beam spots fall inside light receiving sections for radial error signal detection use 7c' and 7d', irrelevantly to errors, such light receiving sections 7c" and 7d" are formed in rectangular shapes having sides parallel with the dividing segment 7x as a border between the main light receiving sections 7a and 7b, as indicated by broken lines in the figure. In the case where the light receiving sections 7c" and 7d" have such a shape, an area of the same is remarkably greater than the area of the light receiving sections 7a, 7b, 7e, and 7f for focus error signal detection use, whereby frequency characteristics deteriorate. Further, since a sum of effective light receiving areas of the light receiving sections 7a, 7e, and 7c" on the left-hand side and a sum of effective light receiving areas of the light receiving sections 7b, 7f, and 7d" on the right-hand side are different, the left region and the right region of the light receiving element 7 have different frequency characteristics. In an optical pickup device for DVDs, particularly, it is important to obtain good signal characteristics in a high frequency band, since a signal frequency band of the device is high, about 4 to 5 MHz.

Generally, a level of noise contained in an output signal outputted from a light receiving section is in proportion to an area of the light receiving section. Further, since the signal level lowers as the frequency of the output signal is higher, the output signal is remarkably affected by noise. In other words, as the light receiving section has a greater area, it becomes more difficult to maintain a good S/N, and as a result, frequency characteristics deteriorate (a good S/N cannot be ensured in a high frequency band).

Further, in the case where a disk having a plurality of recording/reproduction layers is reproduced, stray light from a layer adjacent to a layer accessed is made incident on the light receiving element 7, and a radial offset takes place due to this stray light since the areas of the left and right regions of the light receiving element 7 are different from each other. A quantity of the stray light received by the light receiving element 7 is proportional to the light receiving area thereof, hence, in the case where the radial error signal is detected by detecting a difference between output signals of the light receiving sections 7c" and 7d", a difference between quantities of the stray light received by the light receiving sections 7c" and 7d" appears as a radial offset.

To solve the foregoing problem, it is required to form light receiving sections 7c' and 7d' having as small an area as possible, and to make the areas thereof substantially equal to each other. To satisfy the requirement, it is necessary to form such light receiving sections 7c' and 7d' with a slant with respect to the dividing segment 7x in accordance with offsets of the light beam spots, as indicated by solid lines in FIGS. 14(a) and 14(b). More specifically, the light receiving sections 7c' and 7d' have an equal width W3 in the x direction and an equal length L3 in the y direction. The width W3 is set smaller than a width W4 of the light receiving section 7c" in the x direction, and also smaller than a width W5 of the light receiving section 7c" in the x direction. The length L3 of the light receiving sections 7c' and 7d' is equal to the length L3 of the light receiving sections 7d" and 7d" in the y direction.

With the foregoing arrangement, the area (effective light receiving area) of the light receiving sections 7c' and 7d' is not more than half of the area of the light receiving sections 7c" and 7d" indicated by broken lines.

Therefore, since a difference between the total area of the light receiving sections 7c' and 7d' and the total area of the light receiving sections 7a, 7b, 7e, and 7f becomes smaller, such a small difference in area does not become an obstacle to the light receiving element 7 obtaining good frequency characteristics in a higher frequency band. Besides, since the total effective light receiving areas of the left and right regions of the light receiving element 7 are equal to each other, frequency characteristics in the regions can be made identical to each other. As a result, in the case where a disk having a plurality of recording/reproduction layers is reproduced, incidence of stray light from an adjacent layer to the light receiving element 7 does not cause any radial offset, since the areas of the left and right regions thereof are equal.

FIG. 15(a) shows an example of specific dimensions of the light receiving element 7, and FIG. 15(b) shows an example of arrangement of the hologram element 2 and the light receiving element 7.

As shown in FIG. 15(a), the length L3, the width W3, and a distance between centers of the light receiving sections 7c' and 7d', are 244 µm, 60 µm, and 480 µm, respectively. The width W1 of the main light receiving sections 7a and 7b, and the width W2 of the sub light receiving sections 7e and 7f are 24.5 µm and 11 µm, respectively. A distance between farthest end edges of the sub light receiving sections 7e and 7f is 102 µm. A distance between the main light receiving sections 7a and 7b is 5 µm, while each distance between the main and sub light receiving sections 7a and 7e, and between the main and sub light receiving sections 7b and 7f, is 13 µm. Further, a slant angle of the light receiving section 7c' is set to 20°, while a slant angle of the light receiving section 7d' is set to 5°.

On the other hand, as shown in FIG. 15(b), a distance between centers of the hologram element 2 and the light receiving element 7 in the y direction is set to 800 µm, while a distance therebetween in the x direction is set to 19.8 µm.

Incidentally, it should be understood that the detailed embodiments and specific examples discussed under the title of BEST MODES FOR CARRYING OUT THE INVENTION has a sole purpose of illustrating the present invention in terms of the technologies involved, and it will be obvious that the invention may be varied in many ways. Such variations are not to be regarded as a departure from the spirit and scope of the invention, and all such modifications as would be obvious to one skilled in the art are intended to be included within the scope of the claims below.

INDUSTRIAL APPLICABILITY

As has been described above, the optical pickup device of the present invention is characterized in that: since the supplemental signals from the sub light receiving sections for focus error signal compensation use are adjusted, occurrence of offset to the focus error signal can be suppressed even in the case where the shape of the light beam spot varies due to an arrangement error (an assembly error or the like) of the optical element.

Further, by setting the effective light receiving area of the sub light receiving sections smaller than the effective light receiving area of the main light receiving sections, compensation of the focus error signal is prevented from becoming excessive or insufficient in a great defocus state even in the case where shape variation of the light beam spot on the light receiving element including the main and sub light receiving sections is different from that in a normal state due to an arrangement error when the focus adjusting operation is carried out.

Furthermore, by setting the effective light receiving area of the sub light receiving sections to not less than 25 percent and not more than 80 percent of the effective light receiving area of the main light receiving sections, compensation of the focus error signal is prevented from becoming excessive or insufficient in a great defocus state, irrelevant to presence or absence of an arrangement error, even in the case where shape variation of the light beam spot on the light receiving element including the main and sub light receiving sections is different from that in a normal state when the focus adjusting operation is carried out.

Furthermore, another optical pickup device of the present invention is arranged so that a first order diffractive angle of the hologram element is reduced to such a level that an emitted first order diffracted light is not made incident on the optical element, whereby occurrence of an offset to the focus error signal can be suppressed even in the case where the shape of the light beam spot on the light receiving element varies due to an arrangement error. As a result, compensation of the focus error signal is prevented from becoming excessive or insufficient. Therefore, it is possible to obtain a satisfactory FES curve upon recording/reproduction of an optical disk having a plurality of recording/reproduction layers.

Furthermore, the light receiving sections for radial error signal detection use are provided at least in regions to which return light shifted due to an arrangement error is incident, in such a manner that they have a substantially equal effective light receiving area each. With the foregoing arrangement, in the case where shapes of the light receiving sections are determined so that the return light falls on inside the light receiving sections without being affected by an arrangement error, the effective light receiving areas can be made minimum, whereby the light receiving element including those for focus and radial error signal detection use can be made to have good frequency characteristic in a high frequency band. Moreover, by forming the light receiving sections for radial error signal detection use so that they have a substantially equal effective light receiving area each, frequency characteristics of these light receiving sections become identical to each other. Therefore, when a reproducing operation is carried out with respect to an optical recording medium having a plurality of recording/reproduction layers, it is possible to suppress occurrence of radial offset stemming from stray light from a layer adjacent to a layer accessed.

What is claimed is:

1. An optical pickup device, in which a light beam emitted from a light source is converged onto an optical recording medium through an optical system, and a shift which a focal point of the light beam has made from the optical recording medium is detected based on return light returning from the optical recording medium through said optical system, said optical pickup device comprising:

main light receiving means having at least two main light receiving sections, each main light receiving section producing a main signal in accordance with a quantity of the return light incident thereon;

sub light receiving means having sub light receiving sections, when the shift of the focal point is beyond a dynamic range and the return light becomes incident also on outside said main light receiving sections and partly on said sub light receiving sections, each sub light receiving means producing a sub signal in accordance with a quantity of the part of the return light that is incident thereon; and error signal producing means for producing a focus error signal by compensating the main signal by using the sub signal, wherein said sub light receiving means adjusts an offset of the focus error signal due to an arrangement error of an optical element constituting said optical system, by using the sub signal.

2. The optical pickup device as set forth in claim 1, wherein an effective light receiving area of each sub light receiving section is set smaller than an effective light receiving area of each main light receiving section.

3. The optical pickup device as set forth in claim 2, wherein the effective light receiving area of each sub light receiving section is not less than 25 percent and not more than 80 percent of the effective light receiving area of each main light receiving section.

4. The optical pickup device as set forth in claim 1, wherein said sub light receiving means includes level adjusting means for adjusting a level of the sub signal.

5. An optical pickup device, in which a light beam emitted from a light source is made to pass through a hologram element and is converged onto an optical recording medium through an optical element, and a shift which a focal point of the light beam has made from the optical recording medium is detected based on return light which returns from the optical recording medium and is diffracted by said hologram element, said optical pickup device comprising:

main light receiving means having at least two main light receiving sections, each main light receiving means producing a main signal in accordance with a quantity of the return light incident thereon, the return light having a cross section shape in accordance with the shift which the focal point of the light beam has made from the optical recording medium;

sub light receiving means having sub light receiving sections, when the shift of the focal point is beyond a dynamic range and the return light becomes incident also on outside said main light receiving sections and partly on said sub light receiving sections, each sub light receiving means producing a sub signal in accordance with a quantity of the part of the return light that is incident thereon; and error signal producing means for producing a focus error signal by compensating the main signal by using the sub signal, wherein a first order diffractive angle of said hologram element is set substantially equal to a minimum diffractive angle in such an angle range as causes a first order diffracted light resulting on diffraction of the light beam from said light source by said hologram element to reach outside of a range of incidence to said optical element.

6. The optical pickup device as set forth in claim 5, wherein the first order diffractive angle represented by θ satisfies:

$$(D+r2+\Delta)/L1+r1/L2 \geq \tan\theta \geq (D+r2)/L1+r1/L2$$

where D represents a distance between said light source and said main and sub light receiving sections, r1 represents a radius of said hologram element, r2 represents a radius of an optical element closest to said hologram element, L1 represents a distance between said optical element and said main and sub light receiving sections in a direction parallel with an optical axis of said hologram element, L2 represents a distance between said hologram element and said main and sub light receiving sections in a direction parallel with the optical axis of said hologram element, and Δ represents an arrangement error of said optical element.

7. An optical pickup device, in which a light beam emitted from a light source is converged onto an optical recording medium through an optical system, and a shift which a focal point of the light beam has made from the optical recording medium and a shift of the light beam in an radial direction on the optical recording medium are detected based on return light returning from the optical recording medium through said optical system, said optical pickup device comprising:

focus control means including at least two focus-error-detection-use light receiving sections for producing a first signal in accordance with a quantity of the return light incident thereon, said focus control means producing, based on the first signal, a focus error signal in accordance with the shift of the focal point of the light beam;

radial control means having at least two radial-error-detection-use light receiving sections for providing a second signal in accordance with a quantity of the return light incident thereon, said radial-error-detection-use light receiving sections being provided so as to have said focus-error-detection-use light receiving sections provided therebetween, said radial control means producing, based on the second signal, a radial error signal in accordance with the shift of the light beam in the radial direction, wherein:

said radial-error-detection-use light receiving sections are provided at least in regions to which the return light shifted due to an arrangement error of an optical element constituting said optical system is incident; and said radial-error-detection-use light receiving sections have effective light receiving areas, respectively, which are substantially equal to each other.

* * * * *